United States Patent
Vieira et al.

(10) Patent No.: US 12,531,628 B2
(45) Date of Patent: Jan. 20, 2026

(54) CONCURRENT BEAM SCANNING AND DATA RECEPTION

(71) Applicant: Telefonaktiebolaget LM Ericsson (publ), Stockholm (SE)

(72) Inventors: Joao Vieira, Hjärup (SE); Robert Baldemair, Solna (SE); Sina Maleki, Malmö (SE); Muris Sarajlic, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 97 days.

(21) Appl. No.: 18/578,887

(22) PCT Filed: Jul. 16, 2021

(86) PCT No.: PCT/EP2021/070029
§ 371 (c)(1),
(2) Date: Jan. 12, 2024

(87) PCT Pub. No.: WO2023/284983
PCT Pub. Date: Jan. 19, 2023

(65) Prior Publication Data
US 2024/0348319 A1   Oct. 17, 2024

(51) Int. Cl.
*H04B 7/08* (2006.01)
(52) U.S. Cl.
CPC ............ *H04B 7/088* (2013.01); *H04B 7/0874* (2013.01)
(58) Field of Classification Search
CPC ..................................................... H04B 7/088
(Continued)

(56) References Cited

U.S. PATENT DOCUMENTS

| | | | |
|---|---|---|---|
| 10,939,341 B1 * | 3/2021 | Manganiello | H04W 36/08 |
| 2019/0254026 A1 | 8/2019 | Liu et al. | |

(Continued)

FOREIGN PATENT DOCUMENTS

| | | |
|---|---|---|
| WO | 2020046062 A1 | 3/2020 |
| WO | 2020091527 A1 | 5/2020 |
| WO | 2020238770 A1 | 12/2020 |

OTHER PUBLICATIONS

International Search Report and Written Opinion dated Apr. 21, 2022 for International Application No. PCT/EP2021/070029 filed Jul. 16, 2021, consisting of 20-pages.

(Continued)

*Primary Examiner* — Lihong Yu
(74) *Attorney, Agent, or Firm* — Weisberg I.P. Law, P.A.

(57) ABSTRACT

Methods for a communication node configured with an antenna array having a plurality of antenna elements. Such methods include determining a link metric for a data transmission received or transmitted using a first portion of the antenna elements, and determining a first value for a first function of the link metric and of a performance target for the link metric. Such methods include, based on the first value, selectively updating the first portion and a second portion of the antenna elements by a first number. The second portion is disjoint from the first portion. Such methods include concurrently performing the following when the updated second portion includes at least one antenna element: receiving or transmitting one or more data transmissions using a first beam formed by the updated first portion; and scanning for reference signal transmissions using a second beam formed by the updated second portion.

17 Claims, 9 Drawing Sheets

(58) Field of Classification Search
USPC .......................................................... 375/267
See application file for complete search history.

(56) References Cited

U.S. PATENT DOCUMENTS

| | | | | |
|---|---|---|---|---|
| 2019/0350020 | A1* | 11/2019 | Kim | H04W 8/205 |
| 2019/0373525 | A1* | 12/2019 | Singh | H04W 36/36 |
| 2020/0412425 | A1* | 12/2020 | Laghate | H04B 7/0617 |
| 2021/0105046 | A1 | 4/2021 | Gutman et al. | |
| 2021/0321267 | A1 | 10/2021 | Kim | |
| 2022/0239014 | A1* | 7/2022 | Sikri | H04B 1/0067 |

OTHER PUBLICATIONS

3GPP TSG RAN WG1 Meeting #86 R1-166088; Title: Access mechanism for beam based approach; Agenda Item: 8.1.6; Source: Huawei, HiSilicon; Document for: Discussion and decision; Date and Location: Aug. 22-26, 2016, Gothenburg, Sweden, consisting of 8-pages.

Y. Li et al.; Analysis of Broadcast Signaling for Millimeter Wave Cell Discovery; 2017 IEEE 86th Vehicular Technology Conference (VTC-Fall); Sep. 2017, consisting of 5-pages.

D. De Donno et al.; Millimeter-Wave Beam Training Acceleration Through Low-Complexity Hybrid Transceivers; IEEE Transactions on Wireless Communications, vol. 16, No. 6; Jun. 2017, consisting of 15-pages.

\* cited by examiner

CONCURRENT BEAM SCANNING AND DATA RECEPTION

CROSS-REFERENCE TO RELATED APPLICATION

This application is a Submission Under 35 U.S.C. § 371 for U.S. National Stage Patent Application of International Application Number: PCT/EP2021/070029, filed Jul. 16, 2021 entitled "CONCURRENT BEAM SCANNING AND DATA RECEPTION," the entirety of which is incorporated herein by reference.

TECHNICAL FIELD

The present invention generally relates to wireless networks, and more specifically to techniques that facilitate a user equipment (UE, e.g., wireless device) to use a single antenna array for receiving data from a wireless network while concurrently scanning for reference signals in other beam orientations.

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. NR was initially specified in 3GPP Release 15 (Rel-15) and continues to evolve through subsequent releases, such as Rel-16 and Rel-17.

5G/NR technology shares many similarities with LTE. For example, NR uses CP-OFDM (Cyclic Prefix Orthogonal Frequency Division Multiplexing) in the downlink (DL) from network to user equipment (UE), and both CP-OFDM and DFT-spread OFDM (DFT-S-OFDM) in the uplink (UL) from UE to network. As another example, NR DL and UL time-domain physical resources are organized into equal-sized 1-ms subframes. A subframe is further divided into multiple slots of equal duration, with each slot including multiple OFDM-based symbols. However, time-frequency resources can be configured much more flexibly for an NR cell than for an LTE cell. For example, rather than a fixed 15-kHz OFDM sub-carrier spacing (SCS) as in LTE, NR SCS can range from 15 to 240 kHz, with even greater SCS considered for future NR releases.

In addition to providing coverage via cells as in LTE, NR networks also provide coverage via "beams." In general, a downlink (DL, i.e., network to UE) "beam" is a coverage area of a network-transmitted reference signal (RS) that may be measured or monitored by a UE. In NR, for example, RS can include any of the following: synchronization signal/PBCH block (SSB), channel state information RS (CSI-RS), tertiary reference signals (or any other sync signal), positioning RS (PRS), demodulation RS (DMRS), phase-tracking reference signals (PTRS), etc. In general, SSB is available to all UEs regardless of the state of their connection with the network, while other RS (e.g., CSI-RS, DM-RS, PTRS) are associated with specific UEs that have a network connection.

5G/NR networks are expected to operate at higher frequencies such as 5-60 GHz, which are typically referred to as "millimeter wave" or "mmW" for short. Such systems are also expected to utilize a variety of multi-antenna technology (e.g., antenna arrays) at the transmitter, the receiver, or both. In general, multi-antenna technology can include a plurality of antennas in combination with advanced signal processing techniques (e.g., beamforming). Multi-antenna technology can be used to improve various aspects of a communication system, including system capacity (e.g., more users per bandwidth per area), coverage (e.g., larger area for given bandwidth and number of users), and increased per-user data rate (e.g., in a given bandwidth and area).

Availability of multiple antennas at the transmitter and/or the receiver can be used in different ways to achieve different goals. For example, multiple antennas at the transmitter and/or the receiver can be used to provide additional diversity against radio channel fading. To achieve such diversity, the channels experienced by the different antennas should have low mutual correlation, e.g., a sufficiently large antenna spacing ("spatial diversity") and/or different polarization directions ("polarization diversity").

As another example, multiple antennas at the transmitter and/or the receiver can be used to shape or "form" the overall antenna beam (e.g., transmit and/or receive beam, respectively) in a certain way, with the general goal being to improve the received signal-to-interference-plus-noise ratio (SINR) and, ultimately, system capacity and/or coverage. This can be done, for example, by maximizing the overall antenna gain in the direction of the target receiver or transmitter or by suppressing specific dominant interfering signals. More specifically, the transmitter and/or receiver can determine an appropriate weight for each antenna element in an antenna array so as to produce one or more beams, with each beam covering a particular range of azimuth and elevation relative to the antenna array.

In relatively good channel conditions, the capacity of the channel becomes saturated such that further improving the SINR provides limited capacity improvements. In such cases, using multiple antennas at both the transmitter and the receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain conditions, the channel capacity can increase linearly with the number of antennas and avoid saturation in the data capacity and/or rates. These techniques are commonly referred to as "spatial multiplexing" or multiple-input, multiple-output (MIMO) processing.

Accordingly, spatial multiplexing is a key feature to increase the spectral efficiency of a wireless systems, including 5G/NR. Transmitting multiple layers on the same time-frequency resource can increase the data-rate for a single user (referred to as "SU-MIMO"). Alternatively, transmitting multiple layers on the same time-frequency resource to multiple users (referred to as "MU-MIMO") can increase the system capacity in terms of number of users.

Even so, transmitting multiple layers on the same resource requires sufficient spatial isolation to keep inter-layer interference at an acceptable level. This can be done by transmitting on different orthogonal polarizations, e.g., vertical and horizontal. Since there are only two orthogonal polarizations, however, this limits spatial multiplexing order to two. This is common in current wireless networks, particularly for SU-MIMO. The main constraint is in the UE, where it is difficult to fit an antenna array of many elements having sufficient spatial separation.

In LTE, NR, and other wireless communication systems that utilize beamforming, a key procedure for the base station (e.g., gNB) is to identify a beam that is "best" in some sense for each of the UEs that the base station serves. One way of doing this is for the BS to consecutively transmit orthogonal beams (e.g., based on orthogonal DFT basis functions) sequentially and let the UE estimate the respective DL channel qualities for the respective beams. From these estimates, the UE can determine one or more of optimal beams and feed this information back to the base station. Alternately, the UE can feedback the estimated channels and let the BS figure out the optimal beam(s). This mechanism has been utilized in IEEE 802.11ac as part of an "explicit feedback" procedure and works well if the base station has few antenna elements. This procedure is commonly referred to as "beam sweeping."

Typically, the number of orthogonal beams needed to cover a given area increases with the number of antenna elements at the base station. In general, the amount of gain available from a base station antenna array is proportional to the surface area of the array. The size of individual antenna elements and the spacing between antenna elements is proportional to (e.g., some fraction of) wavelength of the signals the array is intended to transmit and/or receive. Both size and spacing become relatively smaller at higher mmW frequencies (i.e., at lower wavelengths), such that a greater number of antenna elements are needed to obtain the same gain (or link budget) as at lower frequencies. Since beam width is inversely related to number of antenna elements used to form the beam, a greater number of these smaller beams are needed to cover a given area at higher frequencies (e.g., mmW).

Consequently, UEs operating in the given area will experience more transitions between the smaller, higher-frequency beams. To be prepared for these more frequent transitions, UEs will need to allocate more receiver resources to scan for new beams. However, this can create various problems, issues, and/or difficulties for the UE's ongoing reception of DL data.

SUMMARY

Embodiments of the present disclosure provide specific improvements to beamforming in a wireless network (e.g., radio access network, RAN), such as by providing, enabling, and/or facilitating solutions to overcome exemplary problems summarized above and described in more detail below.

Embodiments include methods (e.g., procedures) for a communication node configured with an antenna array having a plurality of antenna elements. These exemplary methods can be performed by a communication node such as a network node (e.g., base station, eNB, gNB, ng-eNB, etc. or component thereof) or a user equipment (UE, e.g., wireless device, etc. or component thereof).

These exemplary methods can include determining a link metric (M) for a data transmission received or transmitted using a first portion (x) of the plurality (N) of antenna elements. These exemplary methods can also include determining a first value (C) for a first function of the link metric (M) and of a performance target (T) for the link metric (M). These exemplary methods can also include, based on the first value (C), selectively updating the first portion (x) and a second portion (y) of the plurality of antenna elements by a first number ($\Delta x$). The second portion (y) is disjoint from the first portion (x).

These exemplary methods can also include concurrently performing the following operations when the updated second portion (y') includes at least one antenna element:
  receiving or transmitting one or more data transmissions using a first beam formed by the updated first portion (x'); and
  scanning for reference signal transmissions using a second beam formed by the updated second portion (y').

In some embodiments, these exemplary methods can also include, based on the updated first portion (x'), repeating the operations of determining the link metric (M), determining the first value (C), and selectively updating.

In some embodiments, the first portion (x) used in relation to determining the link metric (M) is all of the antenna elements of the array. In some embodiments, the first portion (x) and the second portion (y) constitute the plurality of elements of the antenna array.

In some embodiments, the first and second beams have different spatial orientations. In some of these embodiments, the scanning is performed at a plurality of different second beam orientations, with a corresponding plurality of data transmissions being received or transmitted at a first beam orientation (i.e., of the first beam). In some of these embodiments, these exemplary methods can also include identifying the first beam orientation and the plurality of second beam orientations based on a beam sweep using the entire antenna array.

In some of these embodiments, these exemplary methods can also include detecting reference signal transmissions when scanning at a particular second beam orientation. In some variants, detecting reference signal transmissions can include the following: for each second beam orientation, determining a channel impulse response based on energy received via the first and second beams; determining variations, between successive second beam orientations, of a portion of the channel impulse response associated with the second beam; and detecting the reference signal transmissions at the particular second beam orientation when an associated variation is above a threshold.

In some variants, these exemplary methods can also include, after failing to receive one or more data transmissions using the first beam, stopping the scanning for reference signals using the second beam and receiving or transmitting one or more data transmissions at the particular second beam orientation.

In some embodiments, the reference signal transmissions are also received with the data transmissions using the first beam (e.g., via a different path). In other embodiments, the second beam is used to scan for reference transmissions that are not received via the first beam.

In some embodiments, the determined link metric (M) is one of the following: received signal strength, signal-to-noise ratio (SNR), power of reference signals received together with the first data transmission (RSRP), quality of reference signals received together with the first data transmission (RSRQ), bit error rate (BER), block error rate (BLER), signal-to-interference-and-noise ratio (SINR). In some embodiments, the performance target (T) for the link metric (M) is 5 dB.

In some embodiments, selectively updating the first portion (x) and the second portion (y) can include one or more of the following: decreasing the first portion (x) by the first number ($\Delta x$) and increasing the second portion (y) by the first number ($\Delta x$) when the link metric (M) has a first relation to the performance target (T); and increasing the first portion (x) by the first number ($\Delta x$) and decreasing the second portion (y) by the first number ($\Delta x$) when the link metric (M) has a second relation to the performance target (T). The first relation is one of above and below, and the second relation is the other of above and below. The choice of first and second relations can depend on the particular link metric used.

In some of these embodiments, selectively updating the first portion (x) and the second portion (y) can also include selectively adjusting the first number ($\Delta x$) such that both the updated first portion (x') and the updated second portion (y') include 0-N antenna elements.

In some embodiments, these exemplary methods can also include determining a second value for a second function of the first value (C) and of the first portion (x). Selectively updating can be based on the second value. Different variants of this are possible.

In some variants, the first value (C) is M/T, the second value is x/C, and the first number ($\Delta x$) is a one of the following functions of (x/C−x): round, next lowest integer, or next highest integer. In other variants, the first value (C) is 1 when M>T, 0 when M=T, and −1 when M<T. The second value is the first value (C) multiplied by a positive integer (K), and the first number ($\Delta x$) is the lesser of (N−x) and the second value.

In yet other variants, the first value (C) is 1 when M>T, 0 when M=T, and −1 when M<T. The second value is the first value (C) multiplied by a positive integer (K) when C≥0 and N−x when C<0. The first number ($\Delta x$) is the lesser of (N−x) and the second value.

In some embodiments, the first portion (x) and the second portion (y) are spatially disjoint within the antenna array, and the updated first portion (x') and the updated second portion (y') are also spatially disjoint within the antenna array.

In some embodiments, the plurality of antenna elements are coupled to a single receiver chain of the node. In other embodiments, each of the antenna elements is associated with a vertically polarized port and a horizontally polarized port, with the plurality of vertically polarized ports being coupled to a first receiver chain of the communication node and the plurality of horizontally polarized ports being coupled to a second receiver chain of the communication node.

In other embodiments, the plurality of antenna elements are arranged into first and second disjoint subarrays, with the first subarray being coupled to a first receiver chain of the communication node and the second subarray being coupled to a second receiver chain of the communication node.

Other embodiments include communication nodes (e.g., UEs, wireless devices, base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such nodes to perform operations corresponding to any of the exemplary methods described herein.

These and other embodiments can facilitate beam scanning operations without requiring dedicated beam scanning overhead. Additionally, by enabling concurrent beam scanning and data reception (or transmission) rather than requiring switching between the two, embodiments facilitate a consistent flow of data which can be particularly important for lower-latency applications. Also, embodiments reduce likelihood of triggering undesirable beam failure and associated recovery procedures, since a communication node can identify substitute beams via scanning while concurrently receiving (or transmitting) data via the main beam. Embodiments can be particularly suitable for communication nodes operating at higher frequencies (e.g., mmW) with arrays having many antenna elements (e.g., N) that generate narrow beams.

These and other objects, features, and advantages of embodiments of the present disclosure will become apparent upon reading the following Detailed Description in view of the Drawings briefly described below.

DETAILED DESCRIPTION

Figure 1:
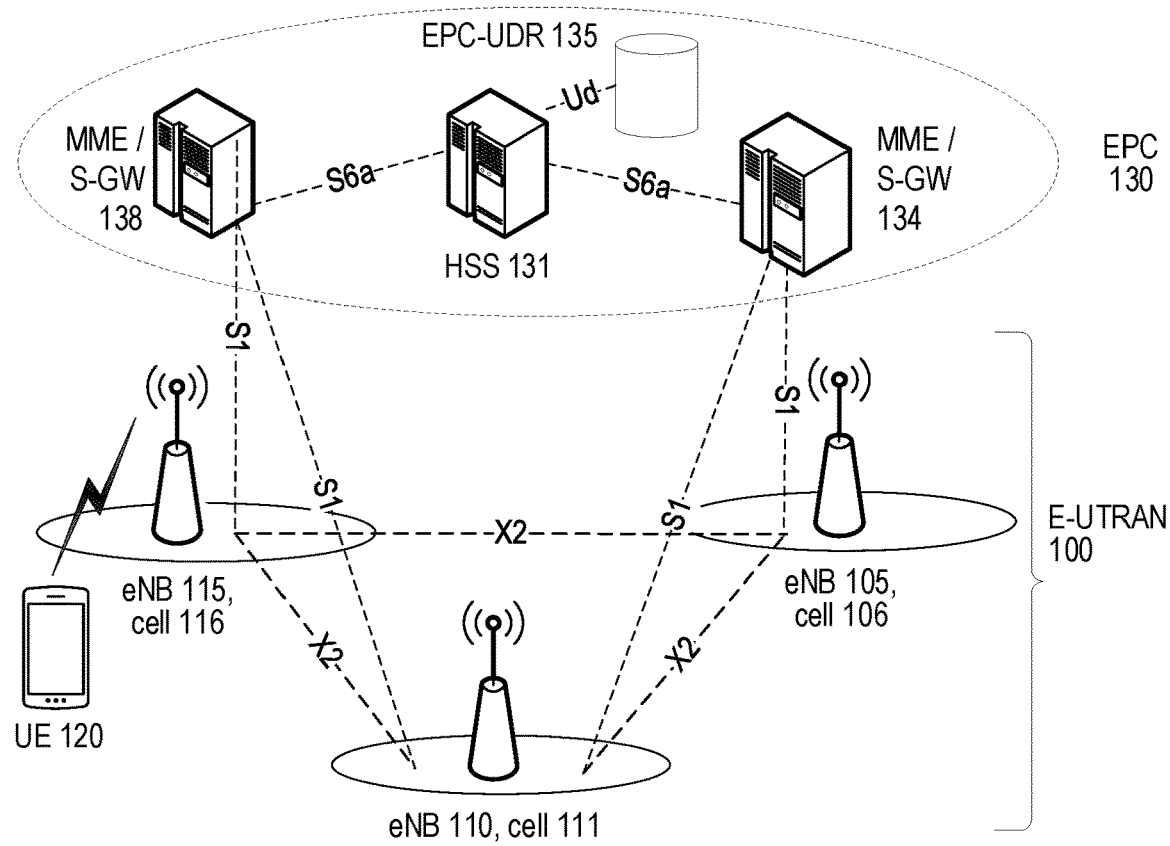
FIG. 1 shows an exemplary LTE network architecture, in which some embodiments of the present disclosure can be implemented.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a radio access node or a wireless device."

Node: As used herein, a "node" can be a network node or a wireless device.

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

FIG. 1 shows an exemplary LTE network architecture, in which some embodiments of the present disclosure can be implemented. Evolved UTRAN (E-UTRAN) 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the Evolved Packet Core (EPC) 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

Figure 2:
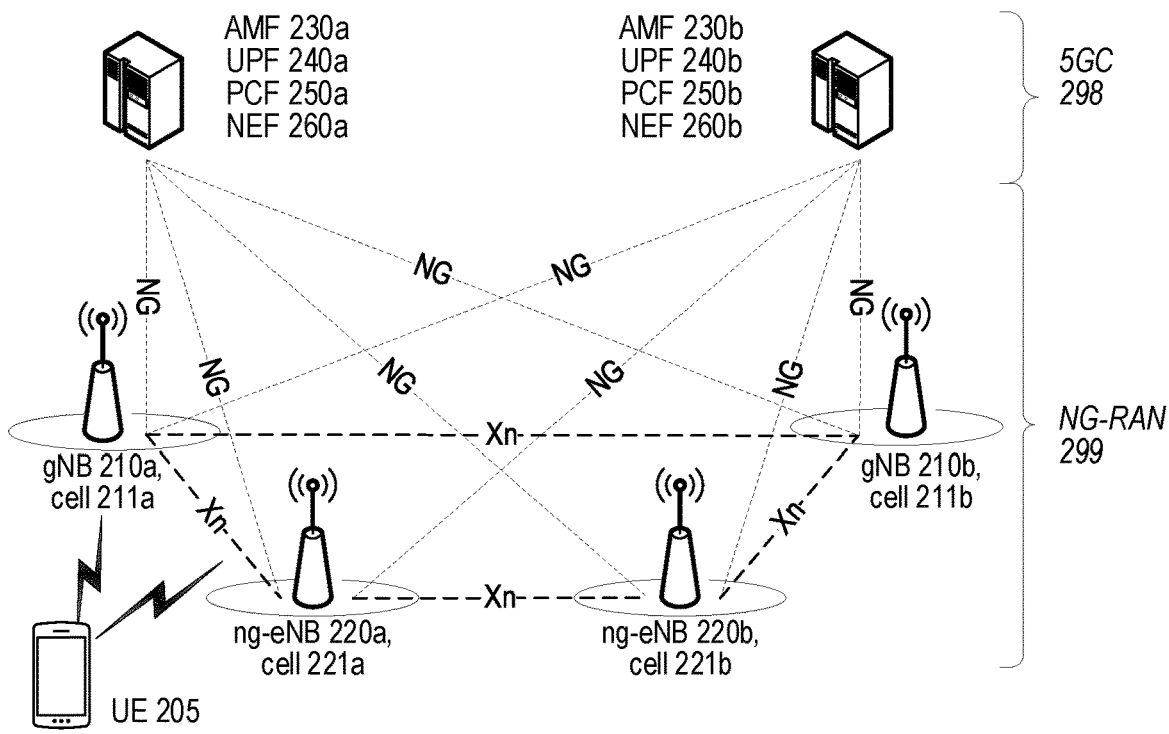
FIG. 2 shows an exemplary 5G network architecture, in which some embodiments of the present disclosure can be implemented.

FIG. 2 shows an exemplary 5G network architecture, in which some embodiments of the present disclosure can be implemented. Next Generation Radio Access Network (NG-RAN) 222 can include gNBs 210 (e.g., 210*a,b*) and ng-eNBs 220 (e.g., 220*a,b*) that are interconnected with each other via respective Xn interfaces. The gNBs and ng-eNBs are also connected via the NG interfaces to 5G Core (5GC) 228, more specifically to the AMF (Access and Mobility Management Function) 230 (e.g., AMFs 230*a,b*) via respective NG-C interfaces and to the UPF (User Plane Function) 240 (e.g., UPFs 240*a,b*) via respective NG-U interfaces. Moreover, the AMFs 230*a,b* can communicate with one or more policy control functions (PCFs, e.g., PCFs 250*a,b*) and network exposure functions (NEFs, e.g., NEFs 260*a,b*). The 5GC can also include session management functions (SMFs, not shown).

Each of the gNBs 210 can support the NR radio interface including frequency division duplexing (FDD), time division duplexing (TDD), or a combination thereof. In contrast, each of ng-eNBs 220 can support the LTE radio interface but, unlike conventional LTE eNodeBs (eNBs), connect to the 5GC via the NG interface. Each of the gNBs and ng-eNBs can serve a geographic coverage area including one more cells, including cells 211*a-b* and 221*a-b* shown as exemplary in FIG. 2.

Additionally, the gNBs and ng-eNBs can also use various directional beams to provide coverage to UEs (e.g., UE 205) in the respective cells. In general, a DL "beam" is a coverage area of a network-transmitted reference signal (RS) that may be measured or monitored by a UE. In NR, for example, such RS can include any of the following, alone or in combination: SS/PBCH block (SSB), CSI-RS, tertiary reference signals (or any other sync signal), positioning RS (PRS), demodulation RS (DMRS or DM-RS), phase-tracking RS (PTRS), etc. In general, SSB is available to all UEs regardless of RRC state, while other RS (e.g., CSI-RS, DMRS, PTRS) are associated with specific UEs that are in RRC_CONNECTED state.

The gNBs shown in FIG. 2 can include a central (or centralized) unit (CU or gNB-CU) and one or more distributed (or decentralized) units (DU or gNB-DU), which can be viewed as logical nodes. CUs host higher-layer protocols and perform various gNB functions such controlling the operation of DUs, which host lower-layer protocols and can include various subsets of the gNB functions. As such, each of the CUs and DUs can include various circuitry needed to perform their respective functions, including processing circuitry, communication interface circuitry (e.g., for communication via Xn, NG, radio, etc. interfaces), and power supply circuitry. Moreover, the terms "central unit" and "centralized unit" can be used interchangeably, as can the terms "distributed unit" and "decentralized unit."

A CU connects to its associated DUs over respective F1 logical interfaces. A CU and associated DUs are only visible to other gNBs and the 5GC as a gNB, e.g., the F1 interface is not visible beyond a CU. A CU can host higher-layer protocols such as F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as Radio Link Control (RLC), Medium Access Control (MAC), and physical-layer (PHY) protocols.

Figure 3:
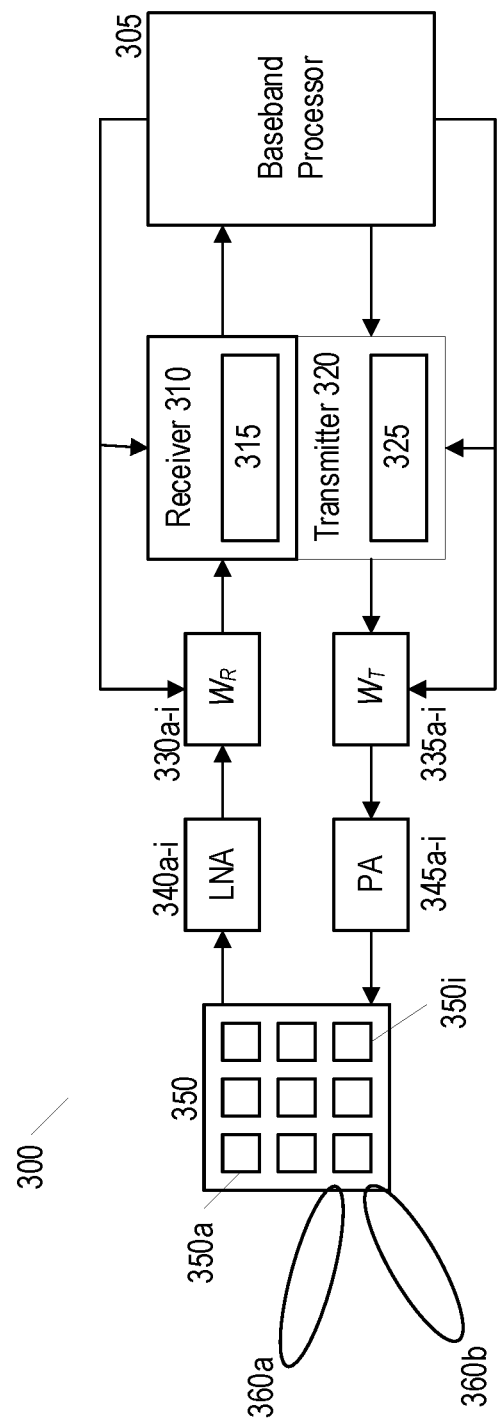
FIG. 3 shows a block diagram of an exemplary multi-antenna transceiver apparatus and/or device in which some embodiments of the present disclosure can be implemented.

FIG. 3 shows a block diagram of an exemplary multi-antenna transceiver apparatus and/or device in which some embodiments of the present disclosure can be implemented. For example, the exemplary transceiver (300) can be a component of a UE or network node, including those described herein with reference to other figures. In such configurations, the transceiver apparatus shown in FIG. 3 can provide beamforming, diversity gains, and/or spatial multiplexing in the manner described herein.

The exemplary apparatus shown in FIG. 3 can also include an antenna array 350 that can comprise a plurality of individual antenna elements arranged in a particular pattern, such as antenna elements 350*a* to 350*i* arranged in an exemplary 3-by-3 grid. In some embodiments, the antenna array 350 can be arranged as an M-by-N array of elements, where $M \geq 1$ and $N > 1$. In some exemplary embodiments, the antenna elements 350*a* to 350*i* can be arranged in a rectangular grid with equal spacing in one or both dimensions; however, other arrangements of the elements comprising the array are possible and are within the scope of the present disclosure, including non-grid, linear, and/or irregular arrangements. In addition, each element of the antenna array 350 can have various physical forms including dipole, patch, cross dipole, inverted F, inverted L, helix, Yagi, rhombic, lens, and/or any another type of antenna topology known to persons of ordinary skill.

Elements 350*a* to 350*i* can utilize various polarization patterns known to persons of ordinary skill, including horizontal, vertical, circular, and cross polarization. For example, elements 350*a* to 350*i*—as well as their arrangement in the array 350—can be designed and/or configured especially for the particular operating frequency (e.g., 3 GHz, 10 GHz, 300 GHz, etc.) and device (e.g., mobile or fixed-location terminal, cellular phone, handset, laptop, tablet, etc.) in which the exemplary apparatus of FIG. 3 can be used.

Antenna elements 350*a* to 350*i* can be used for receiving and/or transmitting signals in combination with, respectively, other receiving and transmitting circuitry comprising the exemplary apparatus. The receiving circuitry can comprise a plurality of low-noise amplifiers (LNAs) 340*a* through 340*i*, each of which can amplify a signal received from a corresponding antenna element 350*a* through 350*i*. The exemplary apparatus can further comprise a plurality of receive gain/phase controls 330*a* through 330*i*, each of which can receive a signal output from a corresponding (LNAs) 340*a* through 340*i*. In some exemplary embodiments, the receive gain/phase controls 330*a* through 330*i* (denoted $W_R$) can comprise a receiver beamformer that can be controlled by, e.g., one or more processors 305. The outputs of the receive gain/phase controls 330a through 330i are provided to a receiver block 310, which can comprise a receive conversion circuit 315. The inputs to block 310 can be at a particular radio frequency (RF), in which case block 310 can comprise circuitry configurable to translate the signals to an intermediate frequency (IF). Nevertheless, the skilled person can readily comprehend that RF-to-IF conversion can alternately occur prior to the signals reaching receiver block 310. As indicated herein, references to "processor" should be understood to mean one or more processors, including one or more computer processors, signal processors, or other processing circuitry.

Receive conversion circuit 315 can also include one or more analog-to-digital converters (ADCs, not shown) that sample the input signals, e.g., at IF. As such, the output of circuit 315 can comprise one or more streams of digitized samples that are provided to a baseband processor 305, which can provide one or more receiver control signals for controlling various operational aspects of, e.g., receive gain/phase controls 330a through 330i, receive conversion circuit 315, etc.

Similarly, processor 305 can provide one or more streams of digitized samples to transmitter block 320, which can comprise a transmit conversion block 325 that can include one or more digital-to-analog converters (DACs, not shown). The output of block 320 (e.g., the output of transmit conversion block 323) can comprise a plurality of analog signals, each of which can be at RF or IF, as described above for the receiving circuitry. Each of the analog signals output by transmitter block 320 can be applied to a corresponding transmit gain/phase control 335a through 335i (denoted $W_T$). Processor 305 can also provide one or more transmitter control signals for controlling various operational aspects of, e.g., transmit gain/phase controls 335a through 335i, transmit conversion block 323, etc. In some exemplary embodiments, transmit gain/phase control 335 can comprise a transmit beamformer that can be controlled by, e.g., processor 305. Each of the signals output by transmit gain/phase control 335a through 335i can be applied to a corresponding transmit power amplifier (PA) 345a through 345i. The amplified outputs of the PAs can be applied to respective corresponding antenna array elements 350a through 350i.

In some embodiments, processor 305 can utilize a direction-of-arrival estimate or other available information to determine appropriate weights (e.g., $W_R$ or $W_T$) to cause the antenna array 350 to produce one or more beam patterns directed to a particular angular direction relative to the antenna array. For example, as shown in FIG. 3, by applying the appropriate weights (e.g., $W_R$ or $W_T$) to the signals received from the antenna elements 350a through 350i, the antenna array 350 can capture signals and/or multipath components that are incident in the directions of arrival corresponding to beams 360a and 360b while rejecting signals and/or multipath components that are incident other directions of arrival. In other exemplary embodiments, the weights can comprise and/or incorporate a precoder matrix that facilitates directing one or more beams directed to particular angular directions, e.g., for a beam sweep or to another device (e.g., base station) located at a specific position.

Processor 305 can program and/or configure receive gain/phase controls 330 and/or transmit gain/phase controls 335 with weights (e.g., $W_R$ or $W_T$, respectively) corresponding to the desired angular direction. Processor 305 can determine weights using various beam-steering or beam-forming algorithms know to persons of ordinary skill, including parametric algorithms and codebook-based algorithms. According to various exemplary embodiments, receive gain/phase controls 330 and/or transmit gain/phase controls 335 can comprise one or more programmable amplifiers that modifies the amplitude and/or phase of the signals (e.g., at RF or IF) from the array elements 350a through 350i. When no gain or phase adjustment of the signals to/from array elements 350a through 350i is required, the processor 305 can program the respective elements of controls 330 and/or 335 to unity gain/zero phase.

Processor 305 can comprise one or more general-purpose microprocessors, one or more special-purpose microprocessors, one or more digital signal processors (DSPs), one or more application specific integrated circuits (ASICs), and/or one or more other types of computer arrangement known to persons of ordinary skill in the art. Furthermore, processor 305 can be programmable and/or configured to perform the functions described herein by executable software code stored in an accessible memory or other type of computer-readable medium. In some exemplary embodiments, memory and/or other computer-readable medium (e.g., including RAM, ROM, memory stick, floppy drive, memory card, etc.) can be permanently programmed and/or configured with such executable software code, while in other exemplary embodiments, the memory or computer-readable medium can have the executable software code downloaded and/or configured.

Receive conversion circuit 315 and transmit conversion circuit 323 can be configured in various ways in relation to antenna elements 350a-i. In an exemplary digital beamforming architecture, the signal from (or to) each antenna element is processed by a separate ADC (or DAC) and receive (or transmit) chain, such that processing of the received signals can be performed entirely in the digital domain. This exemplary architecture can facilitate directing beams in infinite directions, can support an arbitrary number of spatial streams, and can provide spatial division multiplexing to communicate to multiple devices simultaneously.

In an exemplary analog beamforming architecture, the analog signals from (or to) the antenna elements are first combined by an analog phased array, either at radio frequency (RF) or at intermediate frequency (IF, e.g., before or after the mixer). The combined signal can then be processed by a single ADC or a single DAC, as the case may be. Since this design requires only one ADC and one DAC, it can consume less energy compared to the fully digital approach. However, the analog phased array can be oriented in only one direction at a time, thereby limiting the multiple access and searching capabilities.

In an exemplary hybrid beamforming architecture, the available antenna elements can be divided into N clusters, each with multiple elements. In the receiver, signals from all antenna elements in a cluster are combined into a single analog signal, which is then individually digitized with a single ADC. In the transmitter, a single DAC can generate a composite analog signal that is then split into multiple signals, each fed to one antenna element of the cluster. Each cluster can generate a simultaneous beam independent of the other clusters, such that the device can transmit/receive N analog beams in N simultaneous directions.

In LTE, NR, and other wireless communication systems that utilize beamforming, a key procedure for the base station (e.g., eNB, gNB, ng-eNB, CU/DU, etc.) is to identify a beam that is "optimal" in some sense for each of the UEs that the base station serves. One way of doing this is for the base station to consecutively transmit orthogonal beams sequentially and let the UE estimate the respective DL channel qualities for the respective beams.

Beamforming codebooks can be used to reduce signaling requirements. For example, a list of beamforming vectors can be stored in a table in both the network node and the UE, or identified by a particular RS (e.g., a CSI-RS index). By using a fixed and finite codebook of BF vectors, only indices of the BF vectors to be applied need to be sent from a processing unit of the network node via the interface to a beamforming radio unit.

As a more specific example, a codebook (B) of N beamforming vectors (b1 . . . bN) corresponding to respective orientations (1 . . . N) can be used for coverage of a cell. Such a codebook can also be referred to as "grid of beams" (GoB). The choice of beamforming vectors (b1 . . . bN) dictates beam parameters such as peak power and width of beam main lobe as well as level of beam sidelobes.

Maximum beamforming gain can be achieved with a codebook of N Discrete Fourier Transform (DFT) vectors. In other words, the vectors (b1 . . . bN) correspond to N different DFT orthogonal basis functions. The DFT vectors provide a set of beams equally spaced in orientation over a range of interest. This arrangement provides the narrowest beam width for a given N and full utilization of base station power amplifiers (PAs), but at the expense of relatively high sidelobes.

Typically, the number of orthogonal beams needed to cover a given area increases with the number of antenna elements at the base station. In general, the amount of gain available from a base station antenna array is proportional to the surface area of the array. The size of individual antenna elements and the spacing between antenna elements is proportional to (e.g., some fraction of) wavelength of the signals the array is intended to transmit and/or receive. Both size and spacing become relatively smaller at higher mmW frequencies (i.e., at lower wavelengths), such that a greater number of antenna elements are needed to obtain the same gain (or link budget) as at lower frequencies. Since beam width is inversely related to number of antenna elements used to form the beam, a greater number of these smaller beams are needed to cover a given area at higher frequencies (e.g., mmW).

Various issues can occur with these smaller beams. For example, data links (i.e., base station transmit spatial filter, propagation channel, UE receive spatial filter) based on such beams behave more as "on-and-off" rather than gradual degradation. This is due not only to smaller beams but also to high-frequency propagation phenomena including lower wave diffraction and lower object penetration. Thus, the likelihood of beam failure and need for anew beam increases. Also, assuming a constant amount of time/frequency (T/F) resources needed to track each beam, the total amount of resources needed (e.g., by the UE) for beam tracking is expected to increase as beams get smaller at higher frequencies.

UEs operating at higher (e.g., mmW) frequencies with smaller beams will experience more frequent transitions between beams in a given area. To be prepared for these more frequent transitions, UEs will need to allocate more receiver resources to scan for new beams. One conventional beam scanning technique is called "full beam sweep." In this technique, a transmitter (e.g., base station) transmits signals (e.g., RS) sequentially on each of its narrow beams. The receiver (e.g., UE) receives each of the transmitted signals (typically one per beam), processes the received signals to determine some respective quality measures, and feeds back to the transmitter an index of one of the beams that the receiver deems "optimal" in some sense. One drawback with full beam sweeping techniques is that they are very expensive in terms of required RS resources, since they utilize one RS transmission per scanned beam (pair).

Other beam sweeping schemes aim to achieve the same result, but with lower scanning overheads. One such technique is called "hierarchical beam sweep." Here beam sweeping is divided into stages or levels. In the first stage, a codebook of a smaller number of wider beams is used for sweeping an angular range of interest. After the optimal wider beam is selected/determined, a second codebook of narrower beams that span the angular range of the selected wider beam are used for sweeping. More generally, two or more stages with successively narrower beams may be used until a narrow beam is finally chosen. The overall RS overhead has a logarithmic relation to the number of narrow beams.

Another such technique is to replace the conventional GoB DFT codebook by a lower-overhead codebook. Let matrix F denotes the original GoB codebook with all the narrow DFT beams of interest in its columns, with the number of columns equal to the number of resources needed for sounding. Let matrix C have fewer number of columns than F. The goal is to find the best beam of F based on the received signals based on sounding the channel with the smaller number of beams from C, which are chosen in some way to accurately represent the information in F. For example, C=FG, with weighting matrix G (having more rows than columns) producing a smaller number of beams from basis functions that are different linear combinations of the GoB DFT vectors. One exemplary matrix G is the transpose of a Grassmannian frame.

Although the techniques described above achieve lower RS transmission and scanning overheads compared to full beam sweep techniques, they are typically performed in T/F resources that are orthogonal to T/F resources used for other communication activities such as data transmission and reception. For example, UL and DL data transmissions for LTE and NR take place on physical UL shared channel (PUSCH) and physical DL shared channel (PDSCH), respectively. A UE receiving PDSCH on a first set of T/F resources using a first beam cannot perform beam scanning concurrently on other T/F resources. This could be possible if the UE had two separate and distinct antennas and receiver chains, such that one could be allocated for PDSCH reception and the other for beam scanning. However, such an architecture would significantly increase the UE's cost, size, complexity, and energy consumption—all of which are undesirable.

Furthermore, even if reduced-overhead codebooks are used, they still require a significant number of dedicated resources for beam scanning—less than full beam sweeping but still much greater than zero.

Accordingly, Applicants have recognized a need for beam scanning techniques that can be executed concurrently with reception or transmissions of other signals and channels. Applicants have also recognized a need for reducing and/or eliminating RS overhead needed for beam scanning.

Embodiments of the present disclosure address these and other problems, issues, and/or difficulties by providing beam scanning techniques that require minimum (e.g., zero) dedicated overhead and/or that can be performed concurrently (i.e., in same T/F resources) with reception or transmission of other signals and/or channels. At a very high level, such techniques involve creating a beam shape with two beam orientations at a given instance: a first beam orientation for data communication and a second beam orientation to scan for additional beams or beam paths. The second beam orientation can be changed periodically or occasionally to facilitate a beam scan over a range of orientations of interest.

Embodiments of the present disclosure can provide various benefits, advantages, and/or solutions to various problems. For example, unlike conventional techniques, embodiments require no dedicated beam scanning overhead. Additionally, by enabling concurrent beam scanning and data reception (or transmission) rather than requiring switching between the two, embodiments facilitate a consistent flow of data which can be particularly important for lower-latency applications. Also, embodiments reduce likelihood of triggering beam failure and associated recovery procedures, since the receiver can identify substitute beams while receiving (or transmitting) data via the main beam.

Embodiments can be particularly suitable for communication nodes operating at higher frequencies (e.g., mmW) using beamformers with many antenna elements (e.g., N) but only one or two transceiver chains. This is typically the case with analog or hybrid beamformers.

Figure 4A:
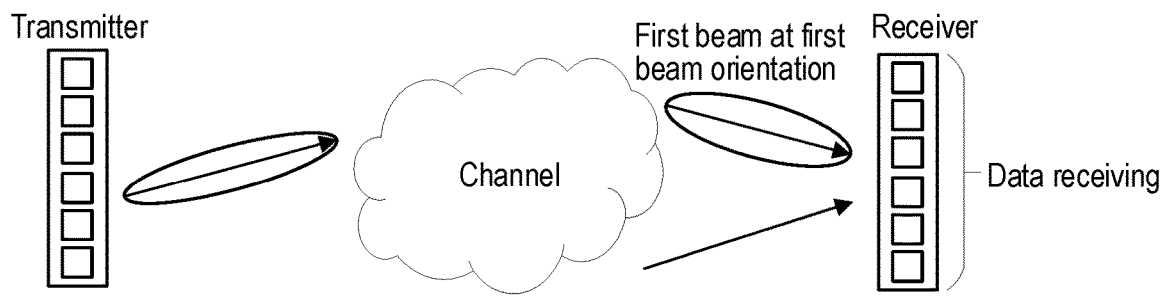
FIGS. 4A-D show communication between a transmitter and a receiver via a channel that illustrates various embodiments of the present disclosure at a high level.

FIGS. 4A-D show communication between a transmitter and a receiver via a channel that illustrates various embodiments at a high level. The transmitter utilizes an antenna array to generate a directional beam for transmission of data towards the receiver. As shown in FIG. 4A, the receiver utilizes all elements of the antenna array to generate a first beam at a first beam orientation to receive the data transmission. The first beam orientation can be for a channel path that is best in some sense, e.g., highest signal strength, lowest delay, highest signal quality, etc.

If the channel is dispersive, however, it will generate reflection(s) of the transmitted signal that travel different paths and reach the receiver at different orientation(s) than the first beam orientation. This is show by the lower arrow exiting the channel in FIG. 4A. However, the orientation of this path does not align with the receiver's first beam.

Subsequently, the receiver can compute a link performance metric (M) for the data transmissions received via the first beam. Various link metrics can be used, including but not limited to received signal strength, signal-to-noise ratio (SNR), power of reference signals received together with the data transmission (RSRP), quality of reference signals received together with the data transmission (RSRQ), bit error rate (BER) or block error rate (BLER) of the received data, signal-to-interference-and-noise ratio (SINR), etc.

If the metric (M) is better than a threshold by a certain amount (e.g., 3 dB), then the receiver allocates a first portion (x, e.g., 50%) of the antenna array to continue receiving the data transmission and a second portion (y, e.g., 50%) of the antenna array to generate a second beam to scan for reference signal transmissions at a second beam orientation (i.e., different than the first beam orientation). This scanning using the second portion (y) is concurrent with the receiving using the first portion (x), i.e., in the same T/F resources.

The receiver can perform the scanning at a plurality of different second beam orientations, denoted 1 to J. Each of these second beams for scanning is generated concurrently with the first beam at the first beam orientation, which is used for data reception. In some embodiments, the J second beam orientations can be selected based on a preliminary beam sweep using the entire antenna array. This can be done, for example, together with selecting the first beam orientation for receiving the data.

Figure 4B:
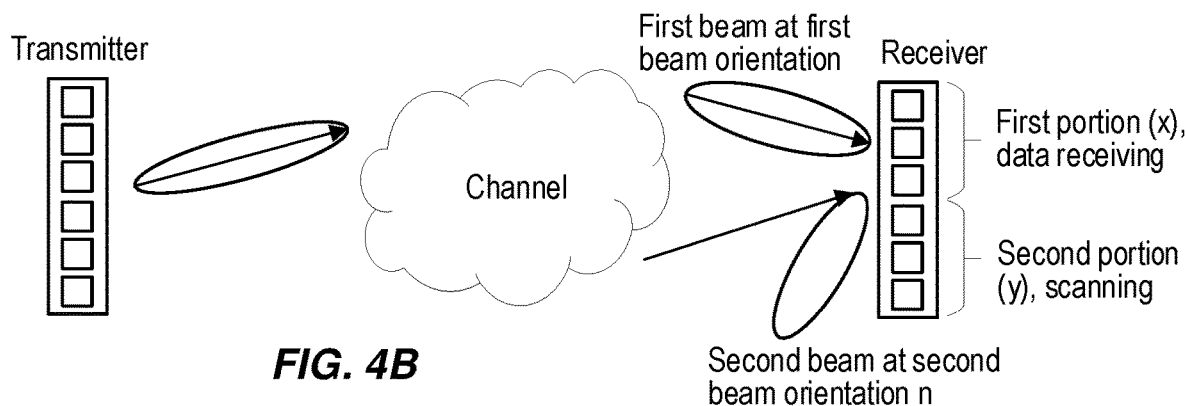
Figure 4C:
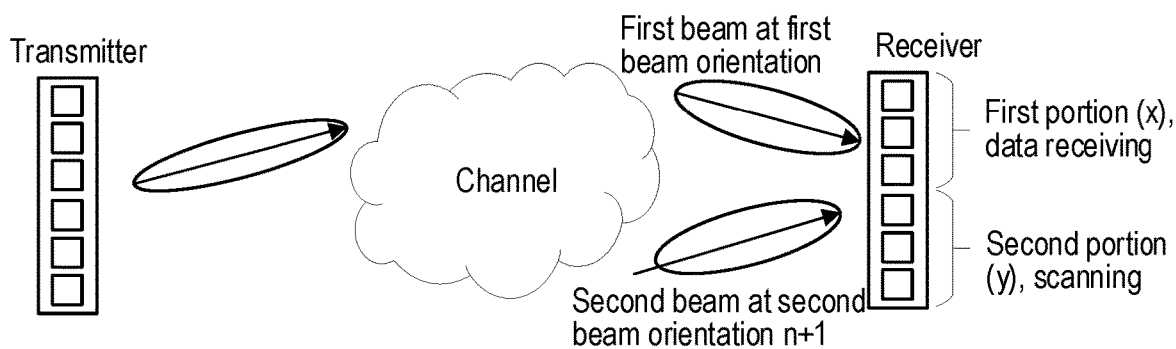

FIG. 4B shows the receiver scanning at second beam orientation n, which does not align with the second data path through the channel (indicated by the lower arrow). In FIG. 4C, the receiver subsequently scans at a next second beam orientation n+1, which aligns with the second data path through the channel. In various embodiments, the receiver can detect reference signals in the second beam based on channel impulse responses measured during successive scans.

Figure 5:
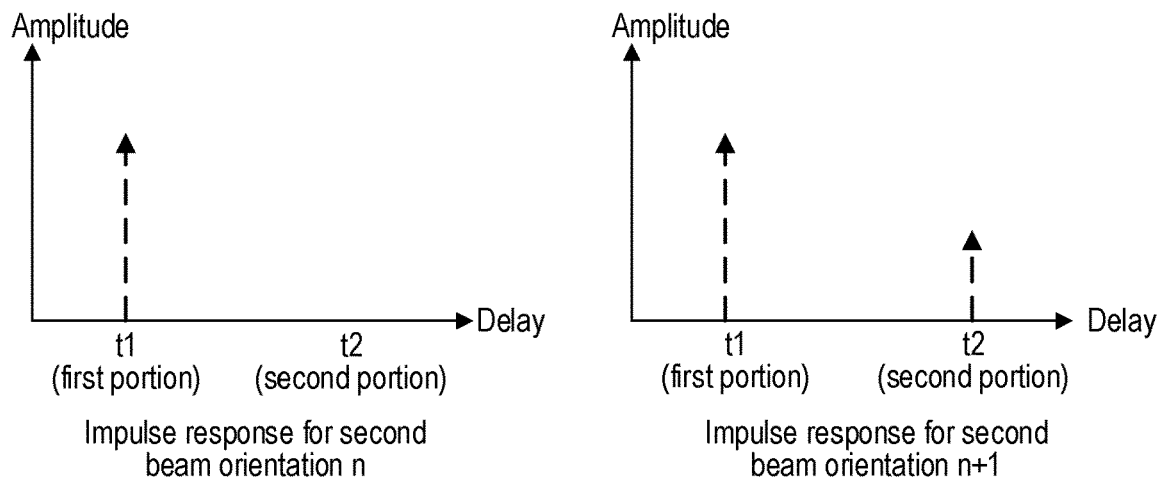
FIG. 5 shows exemplary measured channel impulse responses according to various embodiments of the present disclosure.

FIG. 5 shows exemplary channel impulse responses for second beam orientations n and n+1. Each channel impulse response shows signal amplitude versus delay through the channel. Each path through the channel will generally have a noticeably distinct delay, although delays for certain paths may appear as clusters that are slightly spread in time (e.g., rather than distinct impulses shown in FIG. 5).

In FIG. 5, both channel impulse responses have an amplitude at delay t1, which corresponds to the signal received by the first portion (x) of the antenna array configured to generate the first beam at the first beam orientation. Since the first beam orientation remains fixed, the amplitude at t1 will be relatively constant at various second beam orientations. On the other hand, the amplitude at delay t2 does not appear until the second portion (y) of the antenna array is configured to generate the second beam at second beam orientation n+1. However, there may be noise and/or interference at delay t2 for other second beam orientations. Accordingly, the receiver can detect the presence of a secondary path based on differences in channel impulse responses across successive second beam orientations, such as n and n+1 shown in FIG. 5, particularly amplitudes at delays other than t1.

Figure 4D:
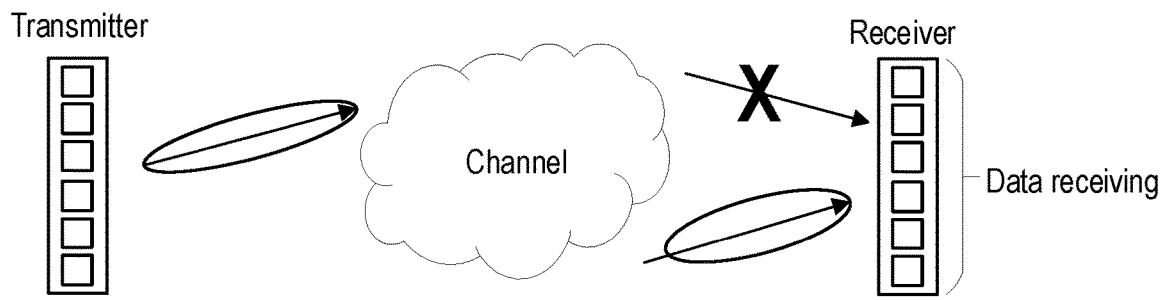

In this manner, the receiver can detect one or more additional channel paths for the data that can be received with different beam orientations than the first beam orientation currently used to receive the data transmissions. In some cases, the first beam at the first beam orientation may fail, e.g., when the receiver moves such that the first beam orientation no longer aligns with the current path (e.g., at delay t1 in FIG. 5). In some embodiments, the receiver can allocate both the first and second portions (e.g., 100%) of the antenna array to generate a beam for receiving data via one of the previously detected channel paths. This is illustrated in FIG. 4D.

Figure 6:
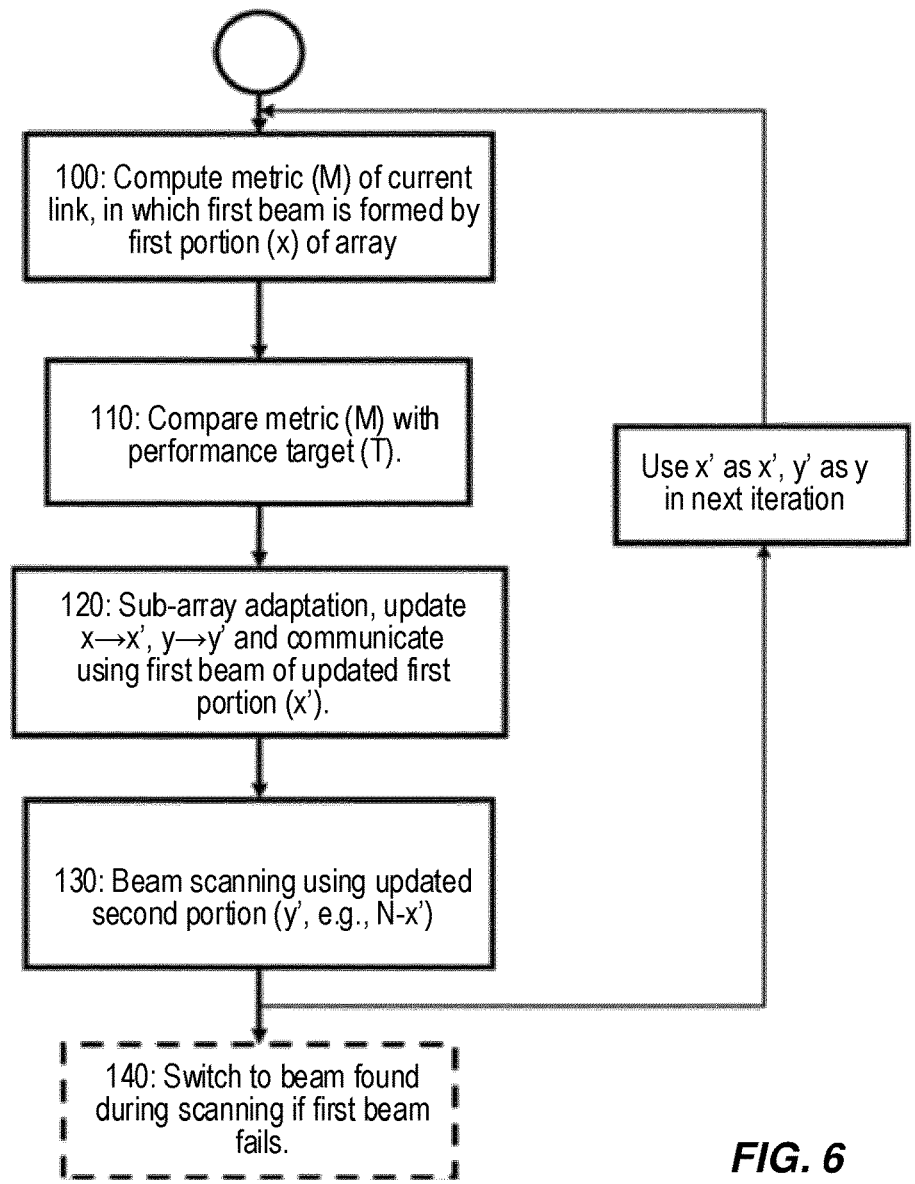
FIG. 6 shows a flow diagram of an exemplary method (e.g., procedure) for a communication node (e.g., UE, wireless device, base station, eNB, gNB, ng-eNB, etc.), according to various embodiments of the present disclosure.

FIG. 6 shows a flow diagram of an exemplary procedure that further illustrates various embodiments of the present disclosure. Although FIG. 6 shows specific blocks in a particular order, the operations of the blocks can be performed in a different order than shown and can be divided and/or combined into blocks having different functionality than shown.

The procedure shown in FIG. 6 is performed by a communication node that is equipped with an antenna array having a plurality (N) of antenna elements. In block 100, the communication node determines a link metric (M) for a data transmission received or transmitted using a first portion (x) of the plurality (N) of antenna elements. The first portion (x) can be used to form a first beam having a first beam orientation, such as shown in FIG. 4A.

In some cases, the first portion (x) can be all N of the antenna elements, i.e., the communication node receives the data (e.g., on PDSCH) or transmits the data (e.g., on PUSCH) using the entire antenna array. This is not required, however, and the communication node can select any x∈[0%, 100%] or 0-N. In case the first portion (x) includes less than N antenna elements, the communication node can use the remaining antenna elements for other purposes, such as for concurrent beam scanning as discussed above.

The possibility of starting the procedure shown in FIG. 6 with x<100% facilitates small increment adaptations (e.g., based on variations in the link metric, M) in the number of antennas used for communication vs. number of antenna used for scanning. For example, the communication node may start with x=100%, and after realizing that the link is favorable, it may update x to x'=70% (or 0.7·N). Subsequently, the communication node may start with x=70% (or 0.7·N) and adapt that value incrementally (e.g., ±5%) based on changes to the link metric (M).

In some embodiments, the link metric (M) computed in block 100 can be one of the following: received signal strength, signal-to-noise ratio (SNR), power of reference signals received together with the first data transmission (RSRP), quality of reference signals received together with the first data transmission (RSRQ). One advantage shared by the above metrics is a generally linear relation between the metric value and the number of antennas used (i.e., x·N). For example, doubling the number of antennas used for transmitting or receiving data results in a 3-dB array gain and a corresponding 3-dB improvement to such link metrics.

In other embodiments, the link metric (M) computed in block 100 can be one of the following: bit error rate (BER), block error rate (BLER), and signal-to-interference-and-noise ratio (SINR). Such metrics do not have a generally linear relation with the number of antennas used, but can be useful nonetheless.

In case the communication node is receiving data using the first portion (x), the communication can determine the link metric (M) directly from the received data and/or reference signals (e.g., DM-RS) that accompany the received data. In case the communication node is transmitting data using the first portion (x), the communication can receive the link metric (M) in a report from the receiver, which can determine the link metric (M) in a similar manner.

In block 110, the communication node can determine a first value (C) for a first function of the link metric (M) and of a performance target (T) for the link metric (M). This can be expressed as follows:

$$C = f(M, T). \quad (1)$$

The performance target (T) is associated with a link metric (M) used in block 100, such as the minimum value needed for correct reception of PDSCH/PUSCH given some system parameter configuration as coding rate, modulation order, etc. For example, the performance target (T) may be 5 dB of received SNR for the data transmission.

One example of a first function is the ratio between the link metric (M) and performance target (M), given below:

$$C = \frac{M}{T} = 1 + E. \quad (2)$$

The value E can be seen as an excess (or deficit, for negative values) in the link's current performance with respect to the performance target (T). For example, if E=10% then the receiver has 10% excess of SNR needed to correctly decode the data. If E=−10% then the system lacks 10% of SNR needed to correctly decode the data. This particular example first function can be particularly useful for link metrics and performance targets that have a generally linear relation with the number of antenna of elements used, as discussed above.

Another example of a first function is a three-valued indicator of the relation between M and T, given below:

$$C = \begin{cases} -1, & M > T \\ 0, & M = T \\ 1, & M < T \end{cases} \quad (3)$$

The first value C can be seen as indicating whether or not there is a need to decrease the first portion (x). This particular example first function can be particularly useful for link metrics and performance targets that do not have a generally linear relation with the number of antenna of elements used, as discussed above.

In some embodiments, instead of C=0 only for M=T, C=0 for |M−T|<ε, which is a small value relative to M and T. These embodiments can avoid "ping-pong" behavior of increasing/decreasing the first portion (x) when the link metric is near the performance target.

In block 120, the communication node selectively updates the first portion (x) and a second portion (y) of the N antenna elements by a first number (Δx) based on the first value (C) determined in block 110. The second portion (y) is disjoint from the first portion (x), i.e., the first and second portions includes different ones of the N antenna elements. More generally, the communication node uses the result of block 110 to adapt its beamformer (e.g., precoder if the communication node is using the first portion to transmit data) with the goal of meeting the performance target (T) using the minimum number of antenna elements for the first portion (x), with other antenna elements (e.g., the second portion, y) being used for other purposes such as scanning for reference signals.

In general, the communication node updates the first portion (x) to a new first portion (x') and the second portion (y) to a new second portion (y') according to the following:

$$x' = x + \Delta x, \quad (4a)$$

$$y' = y - \Delta x. \quad (4b)$$

In some embodiments, the selective updating can be based on a second value determined for a second function of the first value (C) and of the first portion (x). In the context of the example first function given in (2) above, the second value can be x/C, which can also be expressed as:

$$x' = \frac{x}{C} = \frac{x}{1+E}. \quad (5)$$

Alternately, the first number (Δx) can be written as:

$$\Delta x = g\left(\frac{x}{C} - x\right), \quad (6)$$

where g is one of the following functions: round, floor (or next lowest integer), or ceil (next highest integer.

As an illustrative numerical example, assume that x=70% and N=100. If there was an excess of SNR of E=20% when using xN=0.7*100=70 antennas for receiving a data transmission, then operating with x'=1/(1+0.2)~58% of the 100 antennas ensures that there is no SNR excess.

In the context of the example first function given in (3) above, the second value is the first value (C) multiplied by a positive integer (K), which can also be expressed as:

$$x' = \begin{cases} x - K, & C = 1 \\ x, & C = 0 \\ x + K, & C = -1 \end{cases} \quad (7)$$

In other words, the first portion can be increased or decreased by K antenna elements, or left unchanged, depending on the value of C. For example, K=5. Alternately, the first number ($\Delta x$) can be written as:

$$\Delta x = \min(N - x, K), \quad (8)$$

where the "min" function is used to prevent decreasing the first portion to less than zero.

In the context of the example first function given in (3) above, an alternate embodiment can be expressed as:

$$x' = \begin{cases} x - K, & C = 1 \\ x, & C = 0 \\ N \text{ or } 100\%, & C = -1 \end{cases} \quad (9)$$

In other words, the first portion (x) can be decreased by K antenna elements, left unchanged, or increased to the full N elements depending on the value of C. In these embodiments, the first number ($\Delta x$) can be written as shown in (8) above.

In various embodiments, different techniques can be used to determine the first number ($\Delta x$) of antenna elements to remove from the first portion (x) and add to the second portion (y) during the updating in block 120. In embodiments in which the antenna array has a single polarization (e.g., horizontal or vertical), the antenna elements constituting the first portion should be contiguous within the array, and the antenna elements constituting the second portion should also be contiguous within the array. Put differently, the first portion and the second portion should be spatially disjoint from each other within the array. FIG. 4 shows an example where a six-element linear array is divided into a first portion and a second portion having three elements each, with the first and second portions abutting but not overlapping within the array.

Similar principles of contiguous first and second portions that are spatially disjoint can also be applied to antenna arrays with dual polarizations (e.g., horizontal and vertical). Conventionally, the outputs of all vertically polarized antenna ports are linearly combined and input to a first receiver chain, and the outputs to all horizontally polarized antenna ports and linearly combined and fed to a second receiver chain. In some embodiments, the antenna array in such architecture can be divided into two disjoint subarrays, and all antennas of one sub-array (including both vertical and horizontal polarizations) are used to create a first beam intended for data communication, and the antennas of the second subarray (including both vertical and horizontal polarizations) are used to create a second beam for scanning purposes.

In other embodiments, the antenna array in such architecture can be divided into two disjoint subarrays, and the outputs of all vertical and horizontal antenna ports associated a first sub-array are linearly combined and input to a first receiver chain, and the outputs of all vertical and horizontal ports associated with a second sub-array are linearly combined and input to a second RF chain. In some embodiments, a network of switches can be used to configure the routing of RF signals between the antenna elements and receiver chains.

After updating the first and second portions, the communication node uses the updated first portion (x') for data reception/transmission. For example, the communication node updates its beamformer weights applied to the updated first portion (x') of the antenna elements to create an updated first beam having a first beam orientation, as shown in FIGS. 4-5. The node receives or transmits data using the first beam based on the updated first portion (x').

In block 130, the communication node uses the updated second portion (y') to form a second beam having a second beam orientation to use for scanning for reference signals concurrently with receiving or transmitting data using the first beam formed by the updated first portion (x').

The scanning can occur in the same (or subset of) T/F resources of the data transmission. For example, the data transmission may be accompanied by reference signals (e.g., DM-RS); these can be received by the first beam at the first beam orientation and also scanned for by the second beam at the second beam orientation. The cases where these reference signals are received or not received at a particular second beam orientation are shown in FIG. 5, discussed above.

Since the scanning is performed on the same reference signal resources associated with the data transmission received or transmitted via the first beam, there is zero overhead dedicated for this beam scanning process. The instances where different beams are scanned may be chosen at will, such as according to the frame structure of the ongoing PDSCH/PUSCH. For example, the scanning beams may be measured using subsequent PDSCH/PUSCH transmissions, or time durations across which new independent channel estimates are performed.

However, it is not necessary that the scanning be performed on reference signal resources associated with the data transmissions. For example, the second beam can also be used to scan for different reference signals multiplexed in time, frequency, and/or space with the data transmissions.

Due to the concurrent scanning and data reception/transmission (i.e., in same or overlapping T/F resources), measured channel impulse responses will have delay components associated with the first beam formed by the update first portion (x') and, in some instances, delay components associated with the second beam formed by the updated second portion (y'). This is illustrated in FIG. 5, discussed above. Therefore, the communication node can detect reference signal transmissions during a scan procedure based on determining variations between successive second beam orientations of a portion of the channel impulse response associated with the second beam.

For example, assume that two scanning instances (e.g., two DM-RS instances) occur within two PDSCH/PUSCH transmissions between which the channel characteristics are relatively invariant. Denote such measured impulse responses by $h_1(\tau)$ and $h_2(\tau)$, which can be expressed as:

$$h_1[\tau] = h_D[\tau] + h_{S1}[\tau], \, h_2[\tau] = h_D[\tau] + h_{S2}[\tau]. \quad (10)$$

The first term of the impulse responses, $h_D[\tau]$, is due to the part of the channel associated with the first portion of the array, which does not change substantially across measurements. The second terms of the impulse responses, $h_{S1}[\tau]$ and $h_{S2}[\tau]$, are due to the part of the channel associated with second portion of the array, which changes between scanning instances. The communication node may determine differences between two consecutive impulse responses that based on energy of the residuals, e.g.:

$$E_D = \sum_\tau |h_1[\tau] - h_2[\tau]|^2. \quad (11)$$

In some cases, the above operation can be limited to delay values substantially different from $h_D[\tau]$. The communication node can determine that one of the successive second beam orientations is associated with a valid channel path if $E_D$ exceeds a predefined threshold. When this happens, the communication node can determine which of the two successive second beam orientations is associated with a valid channel path based on highest impulse response energy, e.g., choose beam $\hat{m}$ such that:

$$\hat{m} = \arg\max_m \sum_\tau |h_m[\tau]|^2, \quad (12)$$

The detected beam index $\hat{m}$ may then be used for a variety of purposes. For example, in block 140 of FIG. 6, if the current first beam used for data transmission/reception fails, the second beam orientation(s) identified during the scanning could be used as the first beam orientation used for data communication. This can be preferrable to declaring beam failure and triggering recovery mechanisms.

It is unlikely, but theoretically possible, that in the case of using two simultaneous beams for reception, that there is destructive addition of propagation paths incoming from one beam with the propagation paths incoming from the second beam, across the entire frequency band. This may occur if the difference of mean delays of the signals incoming from each beam is smaller than the delay resolution of the system (i.e., inverse of channel bandwidth). In some embodiments, a more conservative approach can be employed to reduce the (already low) probability of destructive interference over the whole band. In this approach, a traditional DL beam sweep (i.e., using CSI-RSs) can be performed periodically or upon triggering by the communication node. Based on this beam sweep, the communication node identifies a first beam orientation for data communication and several backup beam orientations to track according to the scanning procedures described above. Such backup beam orientations should have mean delays significantly different than that of the first beam orientation (e.g., by several delay resolutions of the channel), so that destructive interference over the whole band does not happen.

One precondition for the scanning operation of FIG. 6 block 130 is that the channel properties remain relatively static during the scanning. This criterion can also be used by the receiver to decide whether to perform the scanning and/or for how long to scan. For example, the communication node can use an estimate of channel variability (e.g., Doppler spread/coherence time) for this purpose. If channel coherence time is estimated to be 20 timeslots and the communication node is limited to scanning one second beam orientation per timeslot, it may test 20 second beam orientations at most.

Additionally, impulse responses from different scanning instances should be aligned in time, which can also be a pre-condition for performing the updating operations in block 120 and the scanning operations in block 130. For example, this condition can be satisfied by establishing that quasi-colocation (QCL) type A applies for all pairs of DMRS used for channel estimation in block 130.

Additionally, the beam used to transmit the data transmission received by the communication node should be static (i.e., not change) during the operations of block 130, which can also be a pre-condition for performing the updating operations in block 120 and the scanning operations in block 130. For example, this condition can be satisfied by establishing that QCL type D applies for all pairs of DMRS used for channel estimation in block 130.

Additionally, the communication node should ensure that beam scanning in block 130 will not result in additional deterioration of performance for the data reception, e.g., due to delays falling outside of the data symbol's cyclic prefix (CP). To ensure this, a second threshold for inter-carrier interference (ICI), inter-symbol interference (ISI), or SINR can be used by the communication node. If the ICI/ISI is below the threshold (or SINR above the threshold), the operations of blocks 120-130) may be performed. Additionally, if the receiver detects that performance on the data channel might be compromised due to taps falling outside of the CP, a DL transmission with extended CP can be requested from the transmitter prior to performing operations 120-130.

In some embodiments, the scanning operations of block 130 can be further conditioned upon the updated first portion (x') being greater than a first threshold (e.g., 10% of N). In other words, if the updated first portion (x') is lower than the first threshold, the communication node does not perform the scanning in block 130. Alternatively, if x' is yet larger than a second threshold (which is larger than the first threshold), then the communication node quits the beam scanning operations of block 130 and reverts to normal scanning using orthogonal beams and dedicated resources.

In some embodiments, the scanning operations of block 130 can be further conditioned upon the variation of channel conditions between two consecutive scanning instances being lower than a threshold. For example, when the communication node is mobile and the channel is changing rapidly, stable prediction of beam quality becomes infeasible.

In some embodiments, the updating and scanning operations of blocks 120-130 can be further conditioned upon the variation of data scheduling parameters (e.g., modulation and coding scheme, MCS) being relatively stable. For example, if the communication node is scheduled with 16-QAM in one instance and 64-QAM in the next instance (requiring a larger first portion of antenna elements for data reception), rapid antenna adaptations become infeasible.

Figure 7:
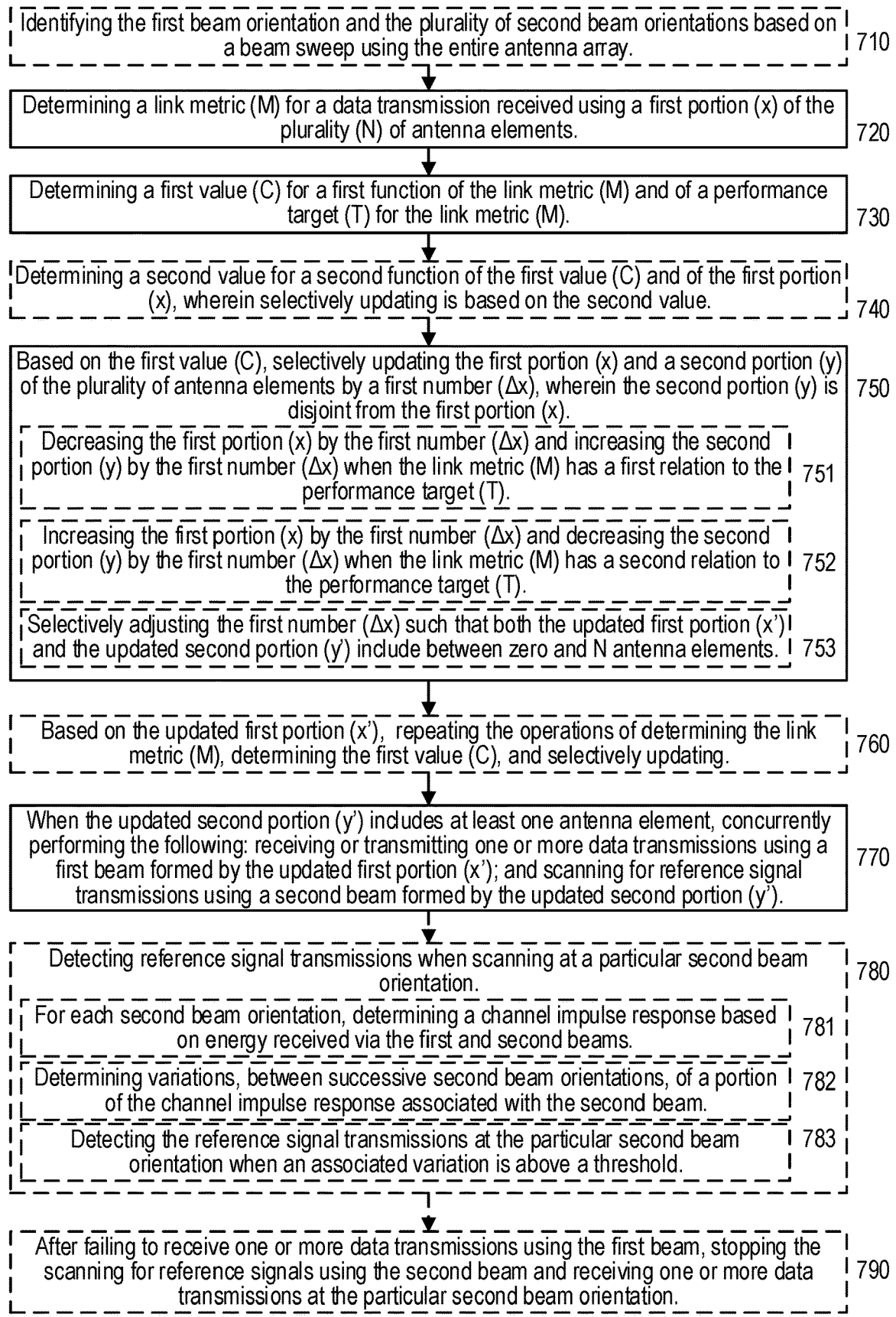
FIG. 7 shows a flow diagram of another exemplary method (e.g., procedure) for a communication node (e.g., UE, wireless device, base station, eNB, gNB, ng-eNB, etc.), according to various embodiments of the present disclosure.

Various features of the embodiments described above correspond to various operations illustrated in FIG. 7, which shows an exemplary method (e.g., procedures) for a communication node configured with an antenna array having a plurality of antenna elements. The method can be performed by a node of a wireless network, such as a network node (e.g., base station, eNB, gNB, ng-eNB, etc. or component thereof) or a user equipment (UE, e.g., wireless device, etc. or component thereof) such as described elsewhere herein. Although FIG. 7 shows specific blocks in a particular order, the operations of the exemplary method can be performed in different orders than shown and can be combined and/or divided into blocks having different functionality than shown. Optional blocks or operations are indicated by dashed lines.

The exemplary method can include the operations of block 720, where the communication node can determine a link metric (M) for a data transmission received or transmitted using a first portion (x) of the plurality (N) of antenna elements. The exemplary method can also include the operations of block 730, where the communication node can determine a first value (C) for a first function of the link metric (M) and of a performance target (T) for the link metric (M). The exemplary method can also include the operations of block 750, where the communication node can, based on the first value (C), selectively update the first portion (x) and a second portion (y) of the plurality of antenna elements by a first number ($\Delta x$). The second portion (y) is disjoint from the first portion (x).

The exemplary method can also include the operations of block 770, where the communication node can concurrently perform the following operations when the updated second portion (y') includes at least one antenna element:
  receive or transmit one or more data transmissions using a first beam formed by the updated first portion (x'); and
  scan for reference signal transmissions using a second beam formed by the updated second portion (y').

In some embodiments, the exemplary method can also include the operations of block 760, where the communication node can, based on the updated first portion (x'), repeat the operations of determining the link metric (M), determining the first value (C), and selectively updating performed in blocks 720, 730, and 750.

In some embodiments, the first portion (x) used in relation to determining the link metric (M) is all of the antenna elements of the array. In some embodiments, the first portion (x) and the second portion (y) constitute the plurality of elements of the antenna array.

In some embodiments, the first and second beams have different spatial orientations. In some of these embodiments, the scanning is performed in block 770 at a plurality of different second beam orientations, with a corresponding plurality of data transmissions being received or transmitted at a first beam orientation (i.e., of the first beam). In some of these embodiments, the exemplary method can also include the operations of block 710, where the communication node can identify the first beam orientation and the plurality of second beam orientations based on a beam sweep using the entire antenna array.

In some of these embodiments, the exemplary method can also include the operations of block 780, where the communication node can detect reference signal transmissions when scanning at a particular second beam orientation. In some variants, detecting reference signal transmissions can include the operation of sub-blocks 781-783. In sub-block 781, the communication node can, for each second beam orientation, determine a channel impulse response based on energy received via the first and second beams. In sub-block 782, the communication node can determine variations, between successive second beam orientations, of a portion of the channel impulse response associated with the second beam. In sub-block 783, the communication node can detect the reference signal transmissions at the particular second beam orientation when an associated variation is above a threshold. Examples of these operations were discussed above in relation to FIG. 5.

In some variants, the exemplary method can also include the operations of block 790, where the communication node can, after failing to receive one or more data transmissions using the first beam, stop the scanning for reference signals using the second beam and receive or transmit one or more data transmissions at the particular second beam orientation (e.g., detected in block 780).

In some embodiments, the reference signal transmissions are also received with the data transmissions using the first beam (e.g., via a different path). In other embodiments, the second beam is used to scan for reference transmissions that are not received via the first beam.

In some embodiments, the link metric (M) determined in block 720 is one of the following: received signal strength, signal-to-noise ratio (SNR), power of reference signals received together with the first data transmission (RSRP), quality of reference signals received together with the first data transmission (RSRQ), bit error rate (BER), block error rate (BLER), signal-to-interference-and-noise ratio (SINR). In some embodiments, the performance target (T) for the link metric (M) is 5 dB.

In some embodiments, selectively updating the first portion (x) and the second portion (y) inn block 750 can include one or more of the following:
  (sub-block 751) decreasing the first portion (x) by the first number ($\Delta x$) and increasing the second portion (y) by the first number ($\Delta x$) when the link metric (M) has a first relation to the performance target (T); and
  (sub-block 752) increasing the first portion (x) by the first number ($\Delta x$) and decreasing the second portion (y) by the first number ($\Delta x$) when the link metric (M) has a second relation to the performance target (T).

The first relation is one of above and below, and the second relation is the other of above and below. The choice of first and second relations can depend on the particular link metric used.

In some of these embodiments, selectively updating the first portion (x) and the second portion (y) in block 750 can also include the operations of sub-block 753, where the communication node can selectively adjust the first number ($\Delta x$) such that both the updated first portion (x') and the updated second portion (y') include between zero and N antenna elements.

In some embodiments, the exemplary method can also include the operations of block 740, where the communication node can determine a second value for a second function of the first value (C) and of the first portion (x). Selectively updating in block 750 can be based on the second value. Different variants of this are possible, as explained below.

In some variants, the first value (C) is M/T, the second value is x/C, and the first number ($\Delta x$) is a one of the following functions of (x/C−x): round, next lowest integer, or next highest integer. Examples of these variants were discussed above in relation to (2), (5), and (6).

In other variants, the first value (C) is 1 when M>T, 0 when M=T, and −1 when M<T. The second value is the first value (C) multiplied by a positive integer (K), and the first number ($\Delta x$) is the lesser of (N−x) and the second value. Examples of these variants were discussed above in relation to (3), (7), and (8).

In other variants, the first value (C) is 1 when M>T, 0 when M=T, and −1 when M<T. The second value is the first value (C) multiplied by a positive integer (K) when C≥0 and N−x when C<0. The first number ($\Delta x$) is the lesser of (N−x) and the second value. Examples of these variants were discussed above in relation to (3), (8), and (9).

In some embodiments, the first portion (x) and the second portion (y) are spatially disjoint within the antenna array, and the updated first portion (x') and the updated second portion (y') are also spatially disjoint within the antenna array.

In some embodiments, the plurality of antenna elements are coupled to a single receiver chain of the node. In other embodiments, each of the antenna elements is associated with a vertically polarized port and a horizontally polarized port, with the plurality of vertically polarized ports being coupled to a first receiver chain of the communication node and the plurality of horizontally polarized ports being coupled to a second receiver chain of the communication node.

In other embodiments, the plurality of antenna elements are arranged into first and second disjoint subarrays, with the first subarray being coupled to a first receiver chain of the communication node and the second subarray being coupled to a second receiver chain of the communication node.

As mentioned above, the exemplary method shown in FIG. 7 can be implemented by a communication node (e.g., UE, base station, etc.) operable in a wireless network (e.g., E-UTRAN, NG-RAN, etc.). For example, the communication node can include communication interface circuitry, specifically including an antenna array having a plurality of antenna elements. An example of this hardware arrangement is shown in FIG. 3. Additionally, the communication node can include processing circuitry operably coupled to the communication interface circuitry, whereby the communication node is configured to perform operations corresponding to any of those described above with reference to FIG. 7. For example, the processing circuitry can perform various operations of blocks 710-790 in cooperation with the antenna array and/or the rest of the communication interface circuitry.

However, the communication node hardware arrangement described above is merely exemplary. More specifically, the communication node can have any hardware arrangement that can be configured and/or arranged to perform operations corresponding to any of those described above with reference to FIG. 7.

Additionally, the exemplary method shown in FIG. 7 can be realized as a non-transitory, computer-readable medium storing computer-executable instructions. When executed by processing circuitry of a communication node configured with an antenna array having a plurality of antenna elements, the instructions configure the communication node to perform operations corresponding to any of those described above with reference to FIG. 7.

Additionally, the exemplary method shown in FIG. 7 can be realized as a computer program product comprising computer-executable instructions. When executed by processing circuitry of a communication node configured with an antenna array having a plurality of antenna elements, the instructions configure the communication node to perform operations corresponding to any of those described above with reference to FIG. 7.

FIGS. 8-13 show various communication systems or networks, UEs, network nodes, etc. in which various embodiments of the present disclosure can be implemented, as described in more detail below.

Figure 8:
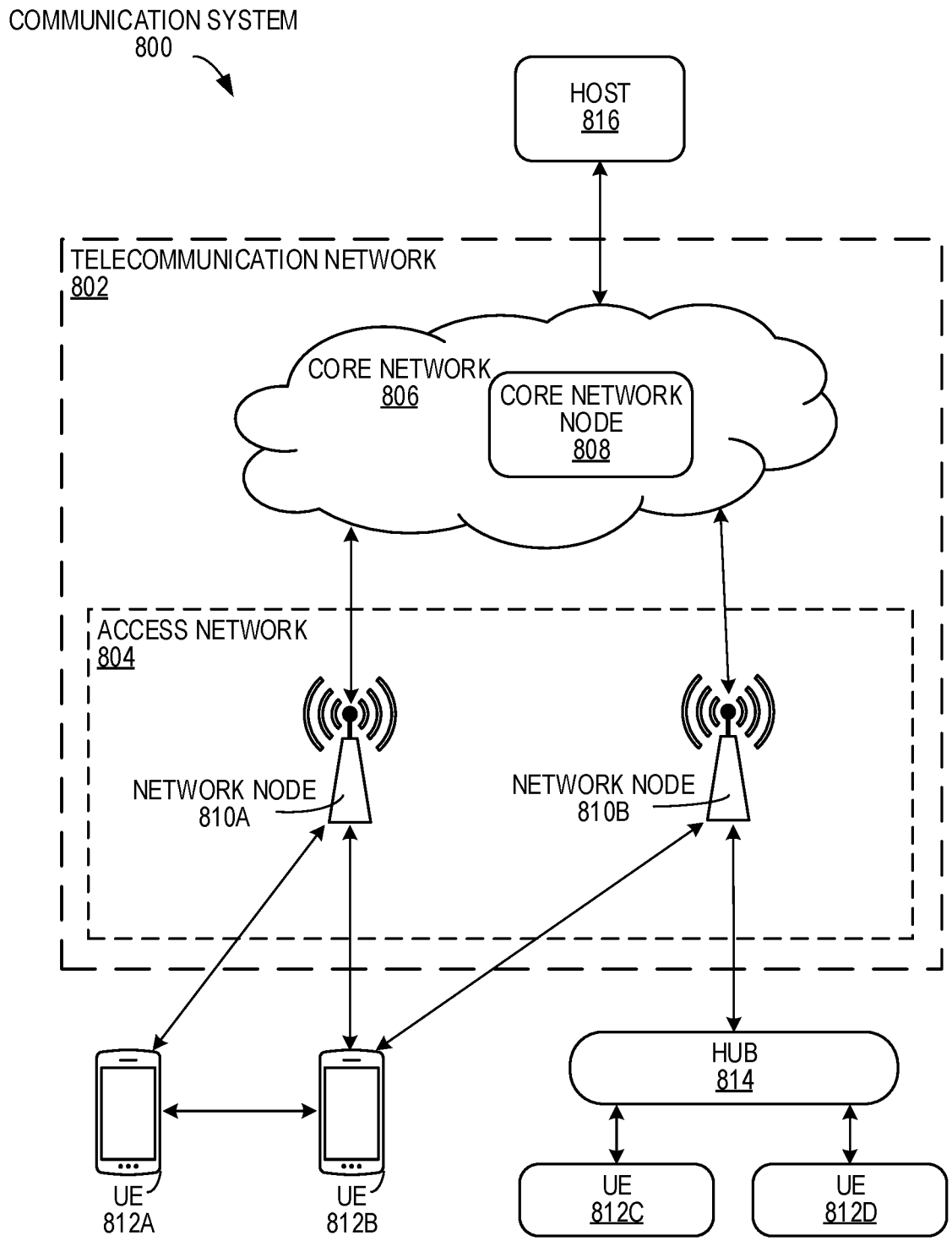
FIG. 8 shows a communication system according to various embodiments of the present disclosure.

In particular, FIG. 8 shows an example of a communication system 800 in accordance with some embodiments. In the example, communication system 800 includes a telecommunication network 802 that includes an access network 804, such as a radio access network (RAN), and a core network 806, which includes one or more core network nodes 808. The access network 804 includes one or more access network nodes, such as network nodes 810a and 810b (one or more of which may be generally referred to as network nodes 810), or any other similar 3$^{rd}$ Generation Partnership Project (3GPP) access node or non-3GPP access point. The network nodes 810 facilitate direct or indirect connection of user equipment (UE), such as by connecting UEs 812a, 812b, 812c, and 812d (one or more of which may be generally referred to as UEs 812) to the core network 806 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 800 may include any number of wired or wireless networks, network nodes, UEs, and/or any other components or systems that may facilitate or participate in the communication of data and/or signals whether via wired or wireless connections. The communication system 800 may include and/or interface with any type of communication, telecommunication, data, cellular, radio network, and/or other similar type of system.

The UEs 812 may be any of a wide variety of communication devices, including wireless devices arranged, configured, and/or operable to communicate wirelessly with the network nodes 810 and other communication devices. Similarly, the network nodes 810 are arranged, capable, configured, and/or operable to communicate directly or indirectly with the UEs 812 and/or with other network nodes or equipment in the telecommunication network 802 to enable and/or provide network access, such as wireless network access, and/or to perform other functions, such as administration in the telecommunication network 802.

In the depicted example, the core network 806 connects the network nodes 810 to one or more hosts, such as host 816. These connections may be direct or indirect via one or more intermediary networks or devices. In other examples, network nodes may be directly coupled to hosts. The core network 806 includes one more core network nodes (e.g., core network node 808) that are structured with hardware and software components. Features of these components may be substantially similar to those described with respect to the UEs, network nodes, and/or hosts, such that the descriptions thereof are generally applicable to the corresponding components of the core network node 808. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 816 may be under the ownership or control of a service provider other than an operator or provider of the access network 804 and/or the telecommunication network 802, and may be operated by the service provider or on behalf of the service provider. The host 816 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 800 of FIG. 8 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 802 is a cellular network that implements 3GPP standardized features. Accordingly, the telecommunications network 802 may support network slicing to provide different logical networks to different devices that are connected to the telecommunication network 802. For example, the telecommunications network 802 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 812 are configured to transmit and/or receive information without direct human interaction. For instance, a UE may be designed to transmit information to the access network 804 on a predetermined schedule, when triggered by an internal or external event, or in response to requests from the access network 804. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio—Dual Connectivity (EN-DC).

In the example, the hub 814 communicates with the access network 804 to facilitate indirect communication between one or more UEs (e.g., UE 812c and/or 812d) and network nodes (e.g., network node 810b). In some examples, the hub 814 may be a controller, router, content source and analytics, or any of the other communication devices described herein regarding UEs. For example, the hub 814 may be a broadband router enabling access to the core network 806 for the UEs. As another example, the hub 814 may be a controller that sends commands or instructions to one or more actuators in the UEs. Commands or instructions may be received from the UEs, network nodes 810, or by executable code, script, process, or other instructions in the hub 814. As another example, the hub 814 may be a data collector that acts as temporary storage for UE data and, in some embodiments, may perform analysis or other processing of the data. As another example, the hub 814 may be a content source. For example, for a UE that is a VR headset, display, loudspeaker or other media delivery device, the hub 814 may retrieve VR assets, video, audio, or other media or data related to sensory information via a network node, which the hub 814 then provides to the UE either directly, after performing local processing, and/or after adding additional local content. In still another example, the hub 814 acts as a proxy server or orchestrator for the UEs, in particular in if one or more of the UEs are low energy IoT devices.

The hub 814 may have a constant/persistent or intermittent connection to the network node 810b. The hub 814 may also allow for a different communication scheme and/or schedule between the hub 814 and UEs (e.g., UE 812c and/or 812d), and between the hub 814 and the core network 806. In other examples, the hub 814 is connected to the core network 806 and/or one or more UEs via a wired connection. Moreover, the hub 814 may be configured to connect to an M2M service provider over the access network 804 and/or to another UE over a direct connection. In some scenarios, UEs may establish a wireless connection with the network nodes 810 while still connected via the hub 814 via a wired or wireless connection. In some embodiments, the hub 814 may be a dedicated hub—that is, a hub whose primary function is to route communications to/from the UEs from/to the network node 810b. In other embodiments, the hub 814 may be a non-dedicated hub—that is, a device which is capable of operating to route communications between the UEs and network node 810b, but which is additionally capable of operating as a communication start and/or end point for certain data channels.

Figure 9:
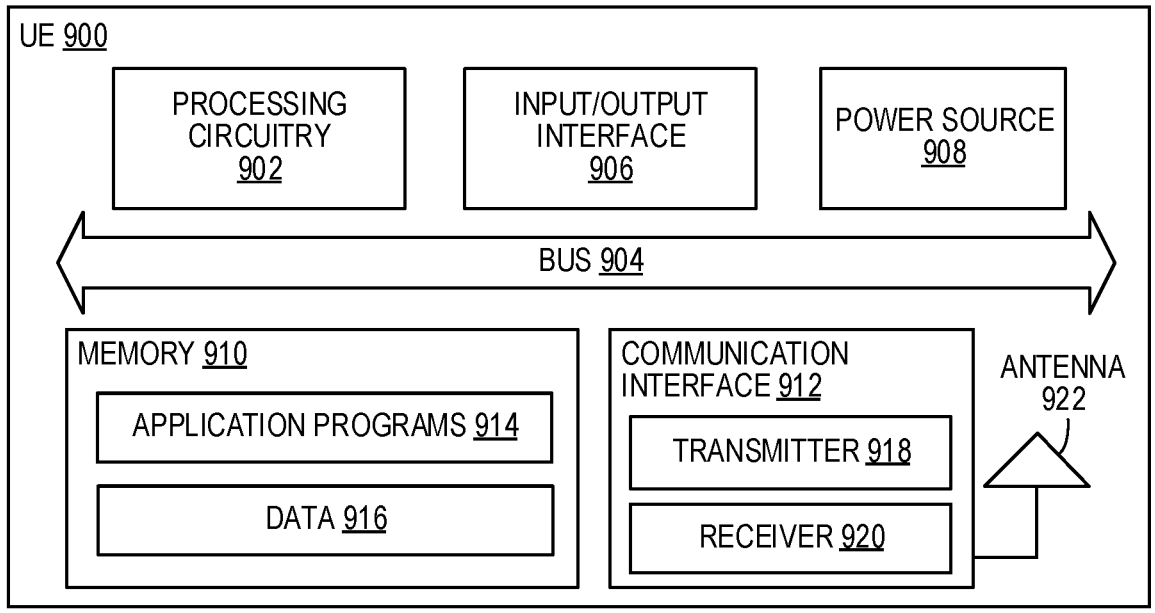
FIG. 9 shows a UE according to various embodiments of the present disclosure.

FIG. 9 shows a UE 900 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 900 includes processing circuitry 902 that is operatively coupled via a bus 904 to an input/output interface 906, a power source 908, a memory 910, a communication interface 912, and/or any other component, or any combination thereof. Certain UEs may utilize all or a subset of the components shown in FIG. 9. The level of integration between the components may vary from one UE to another UE. Further, certain UEs may contain multiple instances of a component, such as multiple processors, memories, transceivers, transmitters, receivers, etc.

The processing circuitry 902 is configured to process instructions and data and may be configured to implement any sequential state machine operative to execute instructions stored as machine-readable computer programs in the memory 910. The processing circuitry 902 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 902 may include multiple central processing units (CPUs).

In the example, the input/output interface 906 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 900. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 908 is structured as a battery or battery pack. Other types of power sources, such as an external power source (e.g., an electricity outlet), photovoltaic device, or power cell, may be used. The power source 908 may further include power circuitry for delivering power from the power source 908 itself, and/or an external power source, to the various parts of the UE 900 via input circuitry or an interface such as an electrical power cable. Delivering power may be, for example, for charging of the power source 908. Power circuitry may perform any formatting, converting, or other modification to the power from the power source 908 to make the power suitable for the respective components of the UE 900 to which power is supplied.

The memory 910 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 910 includes one or more application programs 914, such as an operating system, web browser application, a widget, gadget engine, or other application, and corresponding data 916. The memory 910 may store, for use by the UE 900, any of a variety of various operating systems or combinations of operating systems.

The memory 910 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 910 may allow the UE 900 to access instructions, application programs and the like, stored on transitory or non-transitory memory media, to off-load data, or to upload data. An article of manufacture, such as one utilizing a communication system may be tangibly embodied as or in the memory 910, which may be or comprise a device-readable storage medium.

The processing circuitry 902 may be configured to communicate with an access network or other network using the communication interface 912. The communication interface 912 may comprise one or more communication subsystems and may include or be communicatively coupled to an antenna 922. The communication interface 912 may include one or more transceivers used to communicate, such as by communicating with one or more remote transceivers of another device capable of wireless communication (e.g., another UE or a network node in an access network). Each transceiver may include a transmitter 918 and/or a receiver 920 appropriate to provide network communications (e.g., optical, electrical, frequency allocations, and so forth). Moreover, the transmitter 918 and receiver 920 may be coupled to one or more antennas (e.g., antenna 922) and may share circuit components, software or firmware, or alternatively be implemented separately.

In the illustrated embodiment, communication functions of the communication interface 912 may include cellular communication, Wi-Fi communication, LPWAN communication, data communication, voice communication, multimedia communication, short-range communications such as Bluetooth, near-field communication, location-based communication such as the use of the global positioning system (GPS) to determine alocation, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 912, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 900 shown in FIG. 9.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 10:
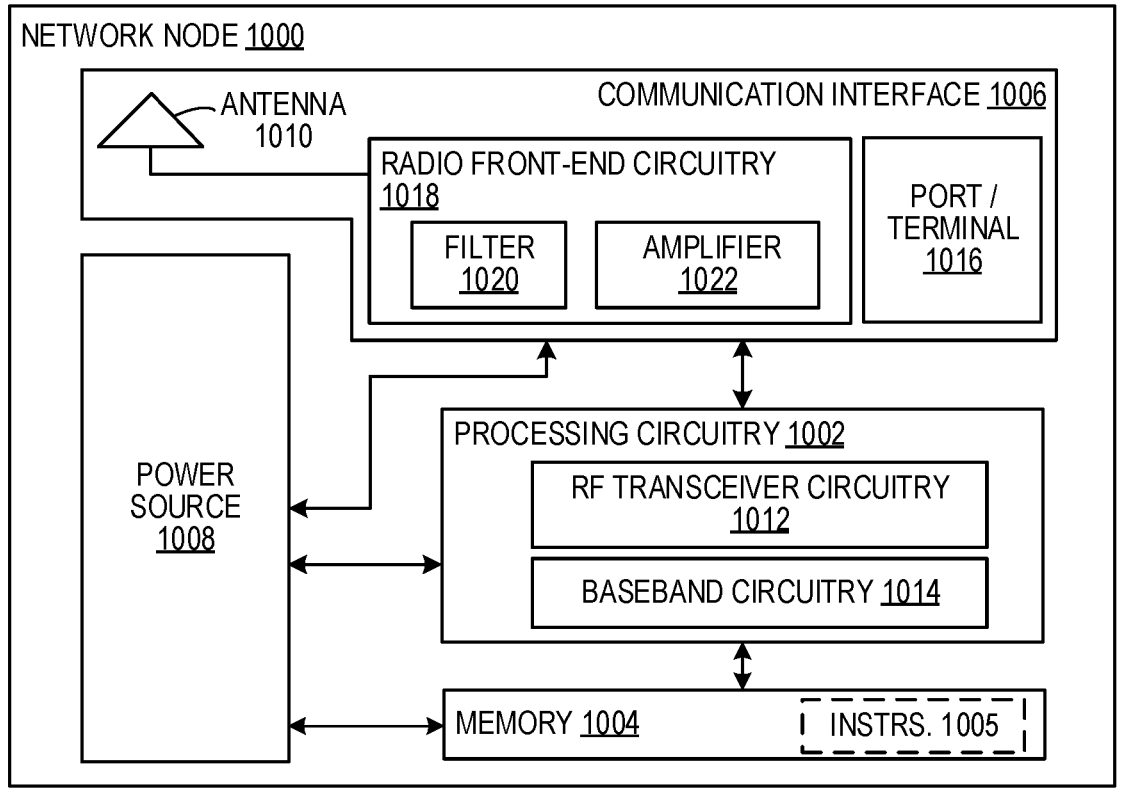
FIG. 10 shows a network node according to various embodiments of the present disclosure.

FIG. 10 shows a network node 1000 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1000 includes a processing circuitry 1002, a memory 1004, a communication interface 1006, and a power source 1008. The network node 1000 may be composed of multiple physically separate components (e.g., a NodeB component and a RNC component, or a BTS component and a BSC component, etc.), which may each have their own respective components. In certain scenarios in which the network node 1000 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1000 may be configured to support multiple radio access technologies (RATs). In such embodiments, some components may be duplicated (e.g., separate memory 1004 for different RATs) and some components may be reused (e.g., a same antenna 1010 may be shared by different RATs). The network node 1000 may also include multiple sets of the various illustrated components for different wireless technologies integrated into network node 1000, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1000.

The processing circuitry 1002 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1000 components, such as the memory 1004, to provide network node 1000 functionality.

In some embodiments, the processing circuitry 1002 includes a system on a chip (SOC). In some embodiments, the processing circuitry 1002 includes one or more of radio frequency (RF) transceiver circuitry 1012 and baseband processing circuitry 1014. In some embodiments, the radio frequency (RF) transceiver circuitry 1012 and the baseband processing circuitry 1014 may be on separate chips (or sets of chips), boards, or units, such as radio units and digital units. In alternative embodiments, part or all of RF transceiver circuitry 1012 and baseband processing circuitry 1014 may be on the same chip or set of chips, boards, or units.

The memory 1004 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1002. The memory 1004 may store any suitable instructions, data, or information, including a computer program, software, an application including one or more of logic, rules, code, tables, and/or other instructions capable of being executed by the processing circuitry 1002 and utilized by the network node 1000. These are denoted collective by instructions 1005 in FIG. 10. The memory 1004 may be used to store any calculations made by the processing circuitry 1002 and/or any data received via the communication interface 1006. In some embodiments, the processing circuitry 1002 and memory 1004 is integrated.

The communication interface 1006 is used in wired or wireless communication of signaling and/or data between a network node, access network, and/or UE. As illustrated, the communication interface 1006 comprises port(s)/terminal(s) 1016 to send and receive data, for example to and from a network over a wired connection. The communication interface 1006 also includes radio front-end circuitry 1018 that may be coupled to, or in certain embodiments a part of, the antenna 1010. Radio front-end circuitry 1018 comprises filters 1020 and amplifiers 1022. The radio front-end circuitry 1018 may be connected to an antenna 1010 and processing circuitry 1002. The radio front-end circuitry may be configured to condition signals communicated between antenna 1010 and processing circuitry 1002. The radio front-end circuitry 1018 may receive digital data that is to be sent out to other network nodes or UEs via a wireless connection. The radio front-end circuitry 1018 may convert the digital data into a radio signal having the appropriate channel and bandwidth parameters using a combination of filters 1020 and/or amplifiers 1022. The radio signal may then be transmitted via the antenna 1010. Similarly, when receiving data, the antenna 1010 may collect radio signals which are then converted into digital data by the radio front-end circuitry 1018. The digital data may be passed to the processing circuitry 1002. In other embodiments, the communication interface may comprise different components and/or different combinations of components.

In certain alternative embodiments, the network node 1000 does not include separate radio front-end circuitry 1018, instead, the processing circuitry 1002 includes radio front-end circuitry and is connected to the antenna 1010. Similarly, in some embodiments, all or some of the RF transceiver circuitry 1012 is part of the communication interface 1006. In still other embodiments, the communication interface 1006 includes one or more ports or terminals 1016, the radio front-end circuitry 1018, and the RF transceiver circuitry 1012, as part of a radio unit (not shown), and the communication interface 1006 communicates with the baseband processing circuitry 1014, which is part of a digital unit (not shown).

The antenna 1010 may include one or more antennas, or antenna arrays, configured to send and/or receive wireless signals. The antenna 1010 may be coupled to the radio front-end circuitry 1018 and may be any type of antenna capable of transmitting and receiving data and/or signals wirelessly. In certain embodiments, the antenna 1010 is separate from the network node 1000 and connectable to the network node 1000 through an interface or port.

The antenna 1010, communication interface 1006, and/or the processing circuitry 1002 may be configured to perform any receiving operations and/or certain obtaining operations described herein as being performed by the network node. Any information, data and/or signals may be received from a UE, another network node and/or any other network equipment. Similarly, the antenna 1010, the communication interface 1006, and/or the processing circuitry 1002 may be configured to perform any transmitting operations described herein as being performed by the network node. Any information, data and/or signals may be transmitted to a UE, another network node and/or any other network equipment.

The power source 1008 provides power to the various components of network node 1000 in a form suitable for the respective components (e.g., at a voltage and current level needed for each respective component). The power source 1008 may further comprise, or be coupled to, power management circuitry to supply the components of the network node 1000 with power for performing the functionality described herein. For example, the network node 1000 may be connectable to an external power source (e.g., the power grid, an electricity outlet) via an input circuitry or interface such as an electrical cable, whereby the external power source supplies power to power circuitry of the power source 1008. As a further example, the power source 1008 may comprise a source of power in the form of a battery or battery pack which is connected to, or integrated in, power circuitry. The battery may provide backup power should the external power source fail.

Embodiments of the network node 1000 may include additional components beyond those shown in FIG. 10 for providing certain aspects of the network node's functionality, including any of the functionality described herein and/or any functionality necessary to support the subject matter described herein. For example, the network node 1000 may include user interface equipment to allow input of information into the network node 1000 and to allow output of information from the network node 1000. This may allow a user to perform diagnostic, maintenance, repair, and other administrative functions for the network node 1000.

Figure 11:
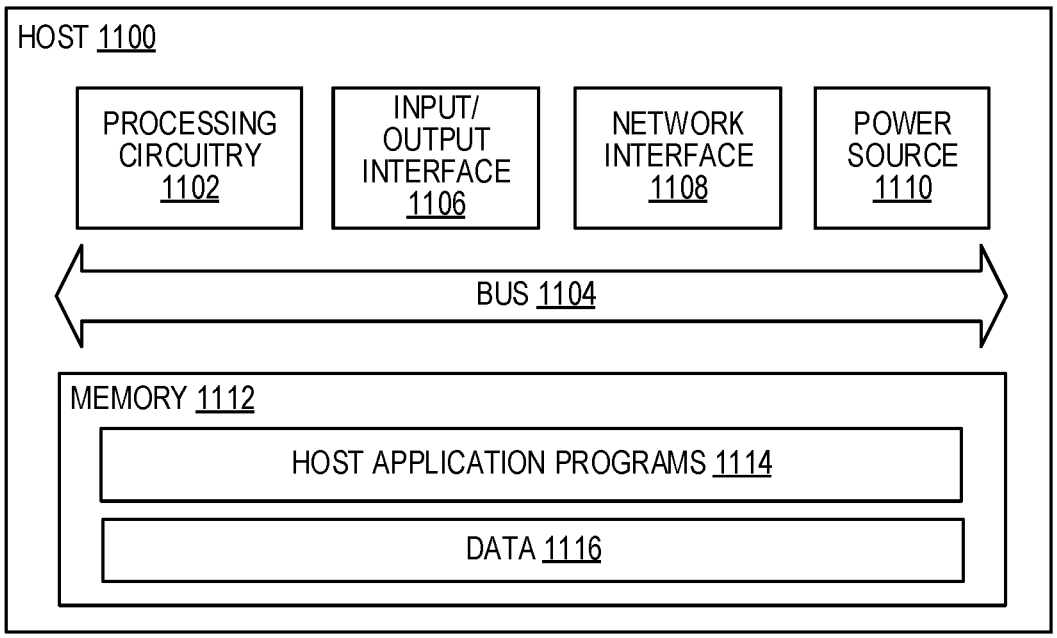
FIG. 11 shows host computing system according to various embodiments of the present disclosure.

FIG. 11 is a block diagram of a host 1100, which may be an embodiment of the host 816 of FIG. 8, in accordance with various aspects described herein. As used herein, the host 1100 may be or comprise various combinations hardware and/or software, including a standalone server, a blade server, a cloud-implemented server, a distributed server, a virtual machine, container, or processing resources in a server farm. The host 1100 may provide one or more services to one or more UEs.

The host 1100 includes processing circuitry 1102 that is operatively coupled via a bus 1104 to an input/output interface 1106, a network interface 1108, a power source 1110, and a memory 1112. Other components may be included in other embodiments. Features of these components may be substantially similar to those described with respect to the devices of previous figures, such as FIGS. 9 and 10, such that the descriptions thereof are generally applicable to the corresponding components of host 1100.

The memory 1112 may include one or more computer programs including one or more host application programs 1114 and data 1116, which may include user data, e.g., data generated by a UE for the host 1100 or data generated by the host 1100 for a UE. Embodiments of the host 1100 may utilize only a subset or all of the components shown. The host application programs 1114 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1114 may also provide for user authentication and licensing checks and may periodically report health, routes, and content availability to a central node, such as a device in or on the edge of a core network. Accordingly, the host 1100 may select and/or indicate a different host for over-the-top services for a UE. The host application programs 1114 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 12:
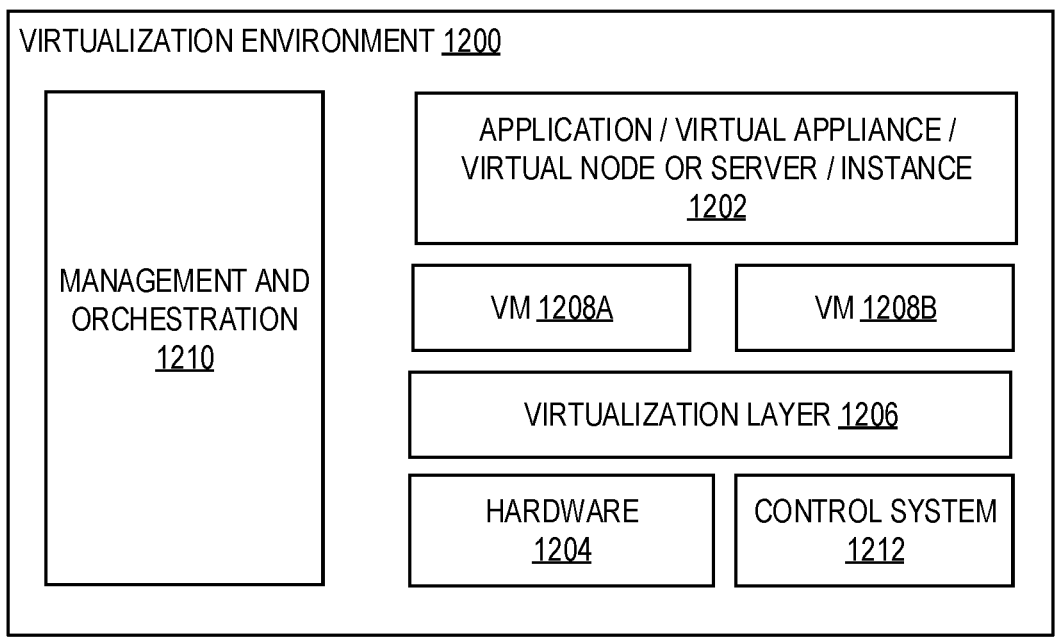
FIG. 12 is a block diagram of a virtualization environment in which functions implemented by some embodiments of the present disclosure may be virtualized.

FIG. 12 is a block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1200 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1202 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1204 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1206 (also referred to as hypervisors or virtual machine monitors (VMMs)), provide VMs 1208a and 1208b (one or more of which may be generally referred to as VMs 1208), and/or perform any of the functions, features and/or benefits described in relation with some embodiments described herein. The virtualization layer 1206 may present a virtual operating platform that appears like networking hardware to the VMs 1208.

The VMs 1208 comprise virtual processing, virtual memory, virtual networking or interface and virtual storage, and may be run by a corresponding virtualization layer 1206. Different embodiments of the instance of a virtual appliance 1202 may be implemented on one or more of VMs 1208, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1208 may be a software implementation of a physical machine that runs programs as if they were executing on a physical, non-virtualized machine. Each of the VMs 1208, and that part of hardware 1204 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1208 on top of the hardware 1204 and corresponds to the application 1202.

Hardware 1204 may be implemented in a standalone network node with generic or specific components. Hardware 1204 may implement some functions via virtualization. Alternatively, hardware 1204 may be part of a larger cluster of hardware (e.g., such as in a data center or CPE) where many hardware nodes work together and are managed via management and orchestration 1210, which, among others, oversees lifecycle management of applications 1202. In some embodiments, hardware 1204 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1212 which may alternatively be used for communication between hardware nodes and radio units.

Figure 13:
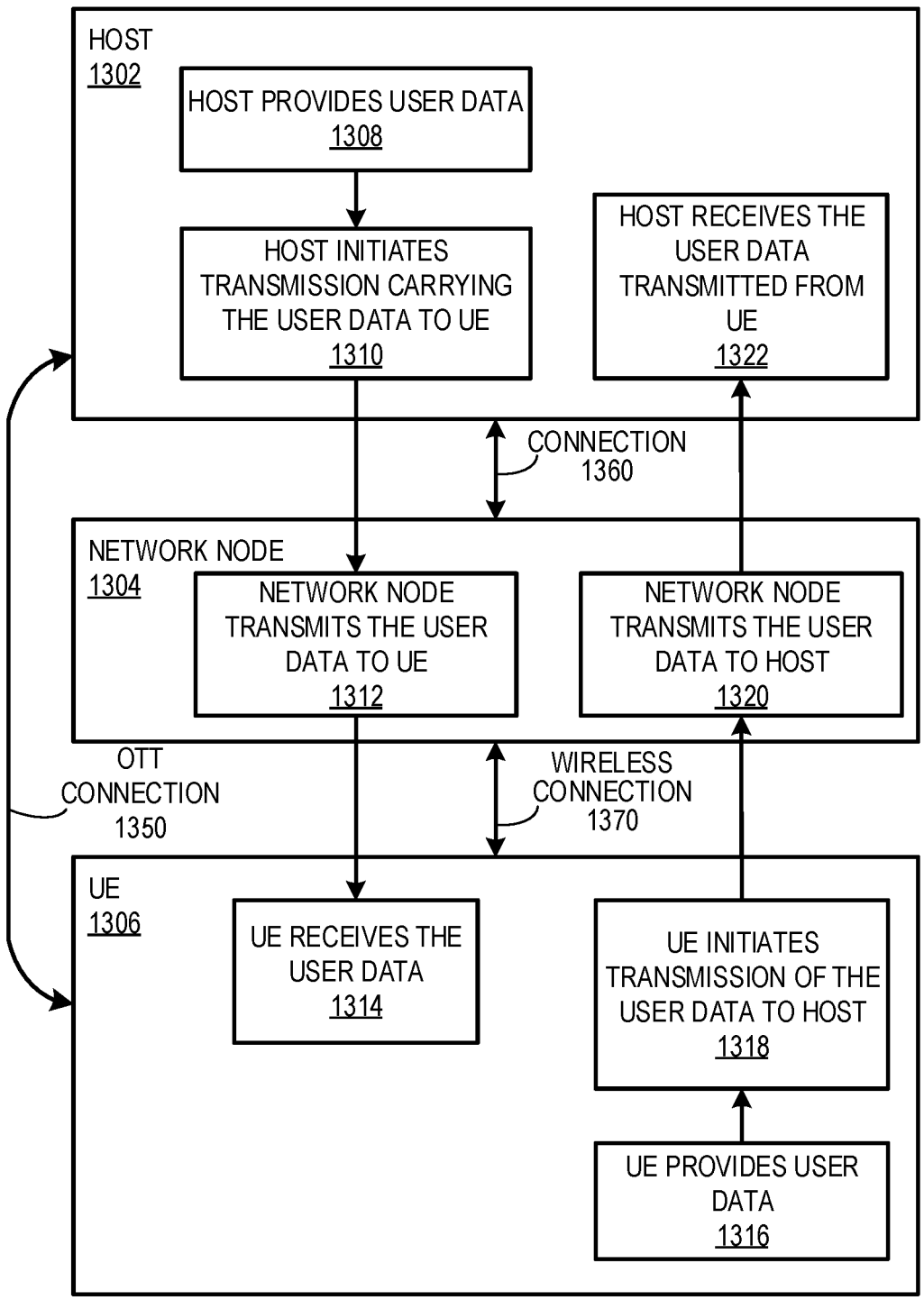
FIG. 13 illustrates communication between a host computing system, a network node, and a UE via multiple connections, at least one of which is wireless, according to various embodiments of the present disclosure.

FIG. 13 shows a communication diagram of a host 1302 communicating via a network node 1304 with a UE 1306 over a partially wireless connection in accordance with some embodiments. Example implementations, in accordance with various embodiments, of the UE (such as a UE 812a of FIG. 8 and/or UE 900 of FIG. 9), network node (such as network node 810a of FIG. 8 and/or network node 1000 of FIG. 10), and host (such as host 816 of FIG. 8 and/or host 1100 of FIG. 11) discussed in the preceding paragraphs will now be described with reference to FIG. 13.

Like host 1100, embodiments of host 1302 include hardware, such as a communication interface, processing circuitry, and memory. The host 1302 also includes software, which is stored in or accessible by the host 1302 and executable by the processing circuitry. The software includes a host application that may be operable to provide a service to a remote user, such as the UE 1306 connecting via an over-the-top (OTT) connection 1350 extending between the UE 1306 and host 1302. In providing the service to the remote user, a host application may provide user data which is transmitted using the OTT connection 1350.

The network node 1304 includes hardware enabling it to communicate with the host 1302 and UE 1306. The connection 1360 may be direct or pass through a core network (like core network 806 of FIG. 8) and/or one or more other intermediate networks, such as one or more public, private, or hosted networks. For example, an intermediate network may be a backbone network or the Internet.

The UE 1306 includes hardware and software, which is stored in or accessible by UE 1306 and executable by the UE's processing circuitry. The software includes a client application, such as a web browser or operator-specific "app" that may be operable to provide a service to a human or non-human user via UE 1306 with the support of the host 1302. In the host 1302, an executing host application may communicate with the executing client application via the OTT connection 1350 terminating at the UE 1306 and host 1302. In providing the service to the user, the UE's client application may receive request data from the host's host application and provide user data in response to the request data. The OTT connection 1350 may transfer both the request data and the user data. The UE's client application may interact with the user to generate the user data that it provides to the host application through the OTT connection 1350.

The OTT connection 1350 may extend via a connection 1360 between the host 1302 and the network node 1304 and via a wireless connection 1370 between the network node 1304 and the UE 1306 to provide the connection between the host 1302 and the UE 1306. The connection 1360 and wireless connection 1370, over which the OTT connection 1350 may be provided, have been drawn abstractly to illustrate the communication between the host 1302 and the UE 1306 via the network node 1304, without explicit reference to any intermediary devices and the precise routing of messages via these devices.

As an example of transmitting data via the OTT connection 1350, in step 1308, the host 1302 provides user data, which may be performed by executing a host application. In some embodiments, the user data is associated with a particular human user interacting with the UE 1306. In other embodiments, the user data is associated with a UE 1306 that shares data with the host 1302 without explicit human interaction. In step 1310, the host 1302 initiates a transmission carrying the user data towards the UE 1306. The host 1302 may initiate the transmission responsive to a request transmitted by the UE 1306. The request may be caused by human interaction with the UE 1306 or by operation of the client application executing on the UE 1306. The transmission may pass via the network node 1304, in accordance with the teachings of the embodiments described throughout this disclosure. Accordingly, in step 1312, the network node 1304 transmits to the UE 1306 the user data that was carried in the transmission that the host 1302 initiated, in accordance with the teachings of the embodiments described throughout this disclosure. In step 1314, the UE 1306 receives the user data carried in the transmission, which may be performed by a client application executed on the UE 1306 associated with the host application executed by the host 1302.

In some examples, the UE 1306 executes a client application which provides user data to the host 1302. The user data may be provided in reaction or response to the data received from the host 1302. Accordingly, in step 1316, the UE 1306 may provide user data, which may be performed by executing the client application. In providing the user data, the client application may further consider user input received from the user via an input/output interface of the UE 1306. Regardless of the specific manner in which the user data was provided, the UE 1306 initiates, in step 1318, transmission of the user data towards the host 1302 via the network node 1304. In step 1320, in accordance with the teachings of the embodiments described throughout this disclosure, the network node 1304 receives user data from the UE 1306 and initiates transmission of the received user data towards the host 1302. In step 1322, the host 1302 receives the user data carried in the transmission initiated by the UE 1306.

One or more of the various embodiments improve the performance of OTT services provided to the UE 1306 using the OTT connection 1350, in which the wireless connection 1370 forms the last segment. More precisely, embodiments described herein can facilitate beam scanning operations without requiring dedicated beam scanning overhead. By facilitating concurrent beam scanning and data reception (or transmission) rather than requiring switching between the two, embodiments facilitate a consistent flow of data which can be particularly important for lower-latency applications. Also, embodiments reduce likelihood of triggering undesirable beam failure and associated recovery procedures, since a communication node can identify substitute beams via scanning while concurrently receiving (or transmitting) data via the main beam. At a higher level, embodiments provide more consistent beam-based data reception and transmission in a wireless network, which increases the value of OTT services that utilized the wireless network to both end users and service providers.

In an example scenario, factory status information may be collected and analyzed by the host 1302. As another example, the host 1302 may process audio and video data which may have been retrieved from a UE for use in creating maps. As another example, the host 1302 may collect and analyze real-time data to assist in controlling vehicle congestion (e.g., controlling traffic lights). As another example, the host 1302 may store surveillance video uploaded by a UE. As another example, the host 1302 may store or control access to media content such as video, audio, VR or AR which it can broadcast, multicast or unicast to UEs. As other examples, the host 1302 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1350 between the host 1302 and UE 1306, in response to variations in the measurement results. The measurement procedure and/or the network functionality for reconfiguring the OTT connection may be implemented in software and hardware of the host 1302 and/or UE 1306. In some embodiments, sensors (not shown) may be deployed in or in association with other devices through which the OTT connection 1350 passes; the sensors may participate in the measurement procedure by supplying values of the monitored quantities exemplified above or supplying values of other physical quantities from which software may compute or estimate the monitored quantities. The reconfiguring of the OTT connection 1350 may include message format, retransmission settings, preferred routing etc.; the reconfiguring need not directly alter the operation of the network node 1304. Such procedures and functionalities may be known and practiced in the art. In certain embodiments, measurements may involve proprietary UE signaling that facilitates measurements of throughput, propagation times, latency and the like, by the host 1302. The measurements may be implemented in that software causes messages to be transmitted, in particular empty or 'dummy' messages, using the OTT connection 1350 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method for a communication node configured with an antenna array having a plurality of antenna elements, the method comprising:
    determining a link metric [M] for a data transmission received or transmitted using a first portion [x] of the plurality [N] of antenna elements;
    determining a first value [C] for a first function of the link metric [M] and of a performance target [T] for the link metric [M];
    based on the first value [C], selectively updating the first portion [x] and a second portion [y] of the plurality of antenna elements by a first number [Δx], wherein the second portion [y] is disjoint from the first portion [x]; and
    when the updated second portion [y'] includes at least one antenna element, concurrently performing the following:
        receiving or transmitting one or more data transmissions using a first beam formed by the updated first portion [x'];
        scanning for reference signal transmissions using a second beam formed by the updated second portion [y'], the first and second beams having different spatial orientations, the scanning performed at a plurality of different second beam orientations of the second beam, and a corresponding plurality of data transmissions received or transmitted at a first beam orientation of the first beam; and
        detecting reference signal transmissions when scanning at a particular second beam orientation, detecting reference signal transmissions comprising:
            for each second beam orientation, determining a channel impulse response based on energy received via the first and second beams;
            determining variations, between successive second beam orientations, of a portion of the channel impulse response associated with the second beam; and
            detecting the reference signal transmissions at the particular second beam orientation when an associated variation is above a threshold.

2. The method of claim 1, further comprising, based on the updated first portion [x'], repeating the operations of determining the link metric [M], determining the first value [C], and selectively updating.

3. The method of claim 1, wherein the first portion [x] is all of the antenna elements.

4. The method of claim 1, further comprising identifying the first beam orientation and the plurality of second beam orientations based on a beam sweep using the entire antenna array.

5. The method of claim 1, further comprising, after failing to receive one or more data transmissions using the first beam, stopping the scanning for reference signals using the second beam and receiving or transmitting one or more data transmissions at the particular second beam orientation.

6. The method of claim 1, wherein the reference
signal transmissions are also received with the data transmissions using the first beam; or
wherein the second beam is used to scan for reference transmissions that are not received via the first beam.

7. The method of claim 1, wherein:
the link metric [M] is one of the following: received signal strength; signal-to-noise ratio, SNR; power of reference signals received together with the first data transmission, RSRP; quality of reference signals received together with the first data transmission, RSRQ; bit error rate, BER; block error rate, BLER; signal-to-interference-and-noise ratio, SINR;
the performance target [T] for the link metric [M] is 5 dB; and
selectively updating the first portion [x] and the second portion [y] comprises one or more of the following:
decreasing the first portion [x] by the first number [Δx] and increasing the second portion [y] by the first number [Δx] when the link metric [M] has a first relation to the performance target [T]; and
increasing the first portion [x] by the first number [Δx] and decreasing the second portion [y] by the first number [Δx] when the link metric [M] has a second relation to the performance target [T],
wherein the first relation is one of above and below, and the second relation is the other of above and below.

8. The method of claim 1, wherein selectively updating the first portion [x] and the second portion [y] further comprises selectively adjusting the first number [Δx] such that both the updated first portion [x'] and the updated second portion [y'] include between zero and N antenna elements.

9. The method of claim 1, further comprising determining a second value for a second function of the first value [C] and of the first portion [x], wherein selectively updating is based on the second value.

10. The method of claim 9, wherein:
the first value [C] is M/T;
the second value is x/C; and
the first number [Δx] is a one of the following functions of (x/C−x): round, next lowest integer, or next highest integer.

11. The method of claim 9, wherein:
the first value [C] is 1 when M>T, 0 when M=T, and −1 when M<T;
the second value is the first value [C] multiplied by a positive integer [K]; and
the first number [Δx] is the lesser of (N−x) and the second value.

12. The method of claim 11, wherein:
the first value [C] is 1 when M>T, 0 when M=T, and −1 when M<T;
the second value is:
the first value [C] multiplied by a positive integer [K] when C≥0, and N−x when C<0; and
the first number [Δx] is the lesser of (N−x) and the second value.

13. The method of claim 1, wherein:
the first portion [x] and the second portion [y] are spatially disjoint within the antenna array; and
the updated first portion [x'] and the updated second portion [y'] are also spatially disjoint within the antenna array; and/or
wherein the plurality of antenna elements are coupled to a single receiver chain of the communication node.

14. The method of claim 1, wherein:
each of the antenna elements is associated with a vertically polarized port and a horizontally polarized port;
the plurality of vertically polarized ports are coupled to a first receiver chain of the communication node; and
the plurality of horizontally polarized ports are coupled to a second receiver chain of the communication node.

15. The method of claim 1, wherein one or both of:
(A) the plurality of antenna elements are arranged into first and second disjoint subarrays;
the first subarray is coupled to a first receiver chain of the communication node; and
the second subarray is coupled to a second receiver chain of the communication node;
and
(B) the first portion [x] and the second portion [y] constitute the plurality of elements of the antenna array.

16. A communication node operable in a wireless network, the communication node comprising:
communication interface circuitry, including an antenna array having a plurality of antenna elements; and
processing circuitry operably coupled to the communication interface circuitry, whereby the processing circuitry and the communication interface circuitry are configured to:
determine a link metric [M] for a data transmission received or transmitted using a first portion [x] of the plurality [N] of antenna elements;
determine a first value [C] for a first function of the link metric [M] and of a performance target [T] for the link metric [M];
based on the first value [C], selectively update the first portion [x] and a second portion [y] of the plurality of antenna elements by a first number [Δx], wherein the second portion [y] is disjoint from the first portion [x]; and
when the updated second portion [y'] includes at least one antenna element, concurrently perform the following:
receiving or transmitting one or more data transmissions using a first beam formed by the updated first portion [x']; and
scanning for reference signal transmissions using a second beam formed by the updated second portion [y'], the first and second beams having different spatial orientations, the scanning performed at a plurality of different second beam orientations of the second beam, and a corresponding plurality of data transmissions received or transmitted at a first beam orientation of the first beam; and
detecting reference signal transmissions when scanning at a particular second beam orientation, detecting reference signal transmissions comprising:
for each second beam orientation, determining a channel impulse response based on energy received via the first and second beams;
determining variations, between successive second beam orientations, of a portion of the channel impulse response associated with the second beam; and
detecting the reference signal transmissions at the particular second beam orientation when an associated variation is above a threshold.

17. A communication node comprising an antenna array having a plurality of antenna elements, the communication node being configured to:
- determine a link metric [M] for a data transmission received or transmitted using a first portion [x] of the plurality [N] of antenna elements;
- determine a first value [C] for a first function of the link metric [M] and of a performance target [T] for the link metric [M];
- based on the first value [C], selectively update the first portion [x] and a second portion [y] of the plurality of antenna elements by a first number [Δx], wherein the second portion [y] is disjoint from the first portion [x]; and
- when the updated second portion [y'] includes at least one antenna element, concurrently perform the following:
  - receiving or transmitting one or more data transmissions using a first beam formed by the updated first portion [x'];
  - scanning for reference signal transmissions using a second beam formed by the updated second portion [y'], the first and second beams having different spatial orientations, the scanning performed at a plurality of different second beam orientations of the second beam, and a corresponding plurality of data transmissions received or transmitted at a first beam orientation of the first beam; and
- detecting reference signal transmissions when scanning at a particular second beam orientation, detecting reference signal transmissions comprising:
  - for each second beam orientation, determining a channel impulse response based on energy received via the first and second beams;
  - determining variations, between successive second beam orientations, of a portion of the channel impulse response associated with the second beam; and
  - detecting the reference signal transmissions at the particular second beam orientation when an associated variation is above a threshold.

* * * * *